US012761942B2

(12) United States Patent
Elcan et al.

(10) Patent No.: US 12,761,942 B2
(45) Date of Patent: Oct. 13, 2026

(54) FAULT DETECTION

(71) Applicant: NVIDIA Corporation, Santa Clara, CA (US)

(72) Inventors: Philip Nelson Elcan, Hillsborough, NC (US); Jason Sequeira, Fremont, CA (US); Daniel Jonathan Hettena, Princeton, NJ (US); William Joseph Armstrong, Rochester, MN (US); Aingarathasan Paramakuru, Pickering (CA); Thomas Fleury, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 328 days.

(21) Appl. No.: 18/491,648

(22) Filed: Oct. 20, 2023

(65) Prior Publication Data

US 2025/0130838 A1 Apr. 24, 2025

(51) Int. Cl.
*G06F 9/455* (2018.01)
*G06F 11/22* (2006.01)

(52) U.S. Cl.
CPC ...... *G06F 9/45558* (2013.01); *G06F 11/2236* (2013.01); *G06F 11/2273* (2013.01); *G06F 2009/4557* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 7,206,966 | B2 | 4/2007 | Barr et al. | |
| 7,509,533 | B1 * | 3/2009 | Govindarajalu .... | G06F 11/2242 714/37 |
| 2009/0138752 | A1 * | 5/2009 | Graham .............. | G06F 11/1484 714/E11.088 |

(Continued)

OTHER PUBLICATIONS

Aaradhana Deshmukh et al., "Parallel Test Task Scheduling on Multi Core Platform", International Journal of Computer Applications (0975-8887), 2010, pp. 54-58, vol. 1—No. 2, https://citeseerx.ist.psu.edu/document?repid=rep1&type=pdf&doi=d2e46dd698990667aa05f5ce2f5e7d77cc29da67.

(Continued)

*Primary Examiner* — Kaushikkumar M Patel
(74) *Attorney, Agent, or Firm* — Lowenstein Sandler LLP

(57) ABSTRACT

Apparatuses, systems, and techniques for testing processing units of a computing system are disclosed herein. A request to initiate a testing process for each of a set of processing units is received. A first processing unit includes a first virtual processor executing first operations. A second processing unit includes a second virtual processor executing second operations. Execution of the first operations is transferred from the first virtual processor to the second virtual processor. Execution of the testing process is initiated at the first processing unit while the second virtual processor executes the first and second operations. In response to a detection that the execution of the testing process is completed, execution of the first and second operations is transferred to the first virtual processor. Execution of the testing process is initiated at the second processing unit while the first virtual processor running executes the first and second operations.

20 Claims, 20 Drawing Sheets

(56) References Cited

U.S. PATENT DOCUMENTS

| | | | | |
|---|---|---|---|---|
| 2010/0192012 | A1* | 7/2010 | Parulkar | G06F 11/2242 714/24 |
| 2019/0050309 | A1* | 2/2019 | Smith | G06F 11/2242 |
| 2021/0165730 | A1* | 6/2021 | Surya | G06F 11/0772 |
| 2024/0004680 | A1* | 1/2024 | Jiang | G06F 11/2025 |

OTHER PUBLICATIONS

Malcolm S. Mollison et al., “Mixed-Criticality Real-Time Scheduling for Multicore Systems”, 2010 10th IEEE international conference on computer and information technology, IEEE, 2010, 8 pages, https://ieeexplore.ieee.org/document/5578010.

* cited by examiner

FAULT DETECTION

TECHNICAL FIELD

At least one embodiment pertains to testing processing units of a computing system. For example, operations to be executed can be transferred from a first virtual processor to a second virtual processor prior to a testing process being performed at a first processing unit that includes the first virtual processor. Upon completion of the testing process, the execution of the operations can be transferred from the second virtual processor to the first virtual processor (or another virtual processor) prior to the testing process being performed at a second processing unit that includes the second virtual processor.

BACKGROUND

A multi-core processor refers to a processor (e.g., a microprocessor) on a single integrated circuit with two or more separate processing units, referred to as cores. Each core of a multi-core processor can read and execute program instructions (e.g., concurrently). Multi-core processors can be included in systems whose failure or malfunction can result in disastrous outcomes. Testing of multi-core processors in such systems can be critical to ensuring the system's safety and efficacy. It can be difficult to coordinate testing of multi-core processors in such systems while maintaining consistent availability of the processors to execute instructions pertaining to the system functionality.

BRIEF DESCRIPTION OF DRAWINGS

Various embodiments in accordance with the present disclosure will be described with reference to the drawings, in which.

DETAILED DESCRIPTION

Figure 1:
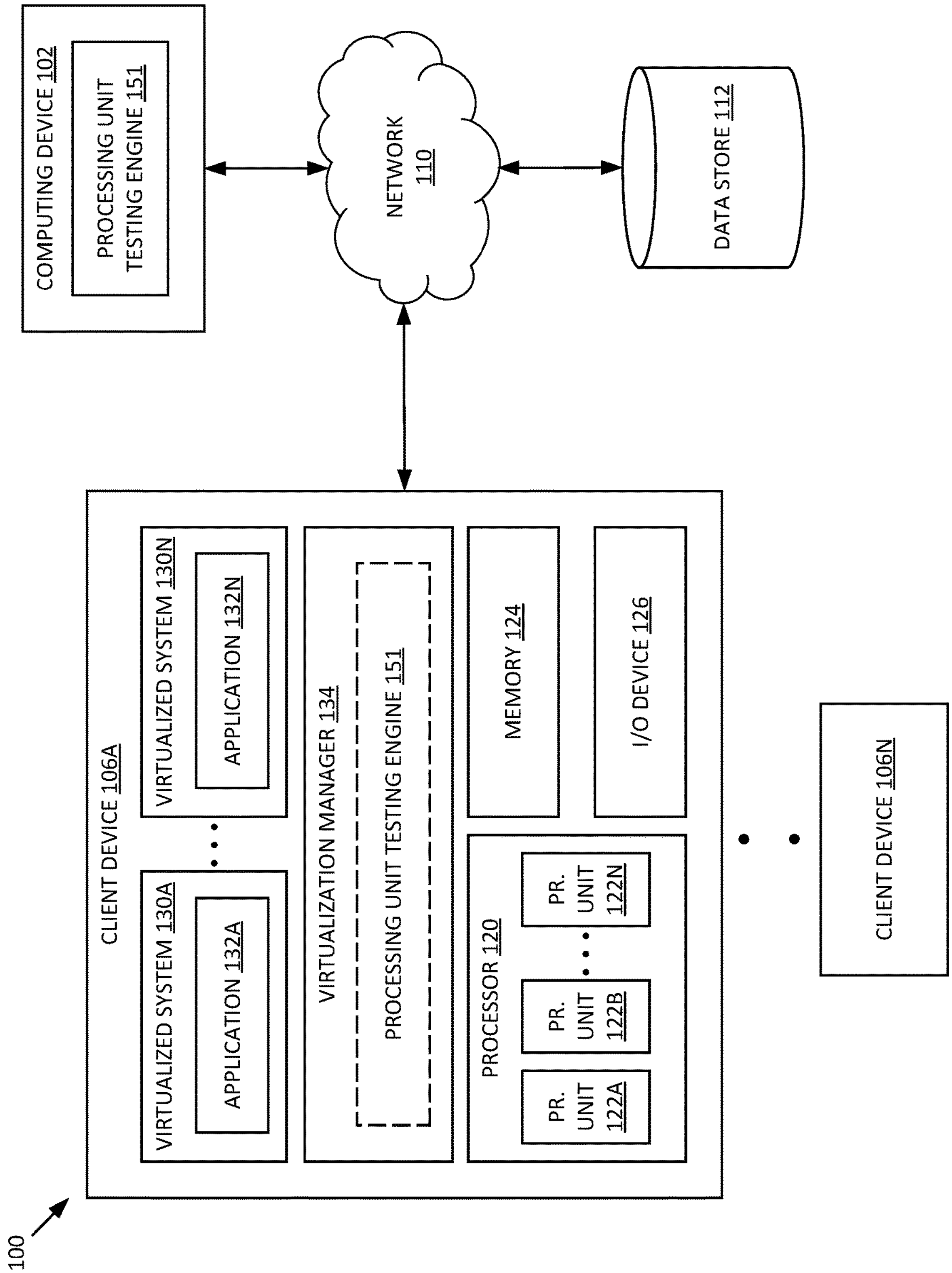
FIG. 1 is a block diagram of an example system architecture, according to at least one embodiment.

A safety critical system refers to a system whose failure or malfunction can result in disastrous outcomes (e.g., serious injury, loss or severe damage to property, etc.). Examples of safety critical systems can include autonomous driving systems, aircraft and/or air traffic control systems, some medical systems, and so forth. Tests can be performed for hardware (e.g., processing units, etc.) and/or software of safety critical systems to ensure the safety and efficacy of such systems. In some instances, testing can be performed while the system is operational. In an illustrative example, a fault detection process can be performed to detect faults in processing units (e.g., central processing units (CPUs), graphics processing units (GPUs), etc.) and/or other hardware components of an autonomous driving system while the autonomous driving system is operated (e.g., by a driver and/or a passenger).

Some computing systems, including safety critical systems, can include multiple processing units that can execute operations concurrently. In some instances, the performance of a computing system can be measured based on an availability of the processing units to execute operations during a particular time period and/or a number of operations that the processing units can execute during the particular time period. A computing system that has processing units that are frequently available to execute operations of one or more applications and/or can safely and successfully execute a high number of operations within a time period can be considered a high performing computing system, while a computing system that has processing units that are frequently unavailable to execute operations of the one or more applications and/or can safely and successfully execute only a low(er) number of operations within the time period can be considered a low performing computing system. As a respective processing unit cannot execute more than one operation at a time, a processing unit that is executing one or more testing operations (e.g., according to a safety test) is unavailable to execute operations for an application running on the system, thus impacting the overall performance (e.g., efficiency, throughput, latency, etc.) of the system.

In conventional systems, entire groups or clusters of processing units (e.g., processing unit cores or processor cores) are taken offline (e.g., made unavailable for application operations) when a testing process is performed at the system and are not brought back online (e.g., made available for application operations) until the entire testing process is complete. In an illustrative example, a computing system can include one or more processor cores that execute operations for an application running on the computing system. During a testing period, processing units of the processor core are taken offline until the testing process is completed. Execution of the operations for the application is therefore temporarily paused at the processor core, which reduces the number of operations that are executed at the system during a particular time period, thereby impacting the overall system performance.

Some systems can include multiple processor cores that each execute operations associated with one or more applications. In some instances, operations executing on a first processor core can be temporarily transferred for execution on a second processor core while processing units of the first processor core are under test. However, processing units of the second processor core may also be executing additional operations (e.g., based on a partitioning scheme for the system) during the test period and accordingly executes operations transferred from the first processor core and the additional operations partitioned to the second processor core during the test period. Since the processing capacity of the second processor core is finite, the second processor core is limited in the number of operations it can execute during the test period, and a performance of executing the operations and the additional operations during the test period may decrease. As a result, an overall performance (e.g., efficiency, throughput, etc.) of the system may decrease. Such performance decrease can impact the overall safety of the system and/or can impact a user experience with the system.

Embodiments of the present disclosure address the above and other deficiencies by providing techniques for online fault detection in safety critical systems using isolation and process migration. An operating system (or another component) of a computing system can receive a request to initiate a testing process for a cluster of processing units (e.g., a processor core) of the computing system. In an illustrative example, the computing system can be included in an autonomous driving system. In some instances, the request can be received according to a testing protocol to testing processing units of the system at particular time intervals (e.g., every 100 milliseconds), based on a safety standard for the autonomous driving system. In some instances, resources of the computing system can be partitioned and/or abstracted for use by one or more virtualized systems (e.g., virtual machines, containers, etc.) that execute applications for the autonomous driving system. Processing units can be partitioned and/or abstracted into one or more virtual processors, which each execute operations for a respective application of the autonomous driving system. In an illustrative example, a first virtual processor hosted by a first processing unit can execute a first set of operations for one or more applications and a second virtual processor hosted by a second processing unit executes a second set of operations for the one or more applications.

In response to receiving the request to initiate the testing process, the operating system (or another component) of the computing system can cause execution of the first set of operations to be transferred from the first virtual processor to the second virtual processor while the testing process is performed for the first processing unit. The operating system can cause execution of the first set of operations to be transferred by transmitting an instruction to a virtual system manager (e.g., a hypervisor, etc.) to transfer execution of the first set of operations to the second virtual processor at the second processing unit. Once execution of the first set of operations is transferred to the second virtual processor, the operating system can initiate execution of the testing process at the first processing unit. The first processing unit can be offline or otherwise unavailable to execute other operations during execution of the testing process. The second virtual processor running on the second processing unit can execute the first set of operations and/or the second set of operations while the testing process is performed at the first processing unit.

Upon detecting that execution of the testing process is completed at the first processing unit, the operating system can cause execution of the first set of operations and the second set of operations to be transferred from the second virtual processor to the first virtual processor (e.g., running on the first processing unit). The operating system can initiate execution of the testing process at the second processing unit while the first virtual processor executes the first set of operations and/or the second set of operations. The second processing unit can be offline or otherwise unavailable to execute other operations during execution of the testing process, as indicated above.

In some instances, the first processing unit and the second processing unit can be included in a common group or cluster of processing units (e.g., a common processor core) with other processing units. Once the testing process is completed at the second processing unit, execution of operations of another processing unit (e.g., a third processing unit) of the processor core can be transferred for execution on the second virtual processor while the testing process is performed for the other processing unit. Execution of operations by the processor core can be transferred to virtual processors hosted by respective processing units in the above described fashion (e.g., a round-robin fashion) until the testing process is performed for each of the processing units of the processor core. In some instances, the testing process is a fault detection process. Upon detecting that the testing process is completed at each processing unit of the processor core, the operating system (or another component of the computing system) can determine whether a fault occurred at any of the processing units based on the outcome of the testing process.

Aspects and embodiments of the present disclosure provide techniques to enable a processing unit (e.g., of a processor core) of a system to be isolated and tested according to a testing process while other processing units of the system continue to execute operations during the testing process. By testing processing units of a processor core according to the above described techniques, each processing unit of the processor core can be taken offline and tested while virtual processors hosted by other processing units of the processor core execute operations originally partitioned to the offline processing unit. Accordingly, only one unit of the processor core is taken offline at a time during the testing time period, rather than each processing unit of the processor core. The amount of time that a respective processing unit is taken offline during a testing process is less than the total amount of time for performing the testing process, which accordingly reduces the amount of time that the respective processing unit is unavailable to execute application operations. In an illustrative example, a total amount of time for performing a testing process can be 100 milliseconds (e.g., according to a safety specification for the computing system). Rather than each processing unit of the processor core being taken offline for the entire 100 milliseconds, each respective processor core is taken offline for 25 milliseconds while other processing units of the processor core continue to execute operations for applications running on the computing system. Accordingly, the amount of time that processing units are available at the computing system and the overall number of operations executed by processing units of the computing system is increased, which improves an overall performance (e.g., efficiency, throughput, latency, etc.) of the computing system.

The systems and methods described herein may be used for a variety of purposes, by way of example and without limitation, these purposes may include systems or applications for online multiplayer gaming, machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray tracing, path tracing, etc.), collaborative content creation for 3D assets, digital twin systems, cloud computing and/or any other suitable applications.

Disclosed embodiments may be comprised in a variety of different systems such as systems for participating on online gaming, automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for generating or maintaining digital twin representations of physical objects, systems implemented at least partially using cloud computing resources, and/or other types of systems.

FIG. 1 is a block diagram of an example system architecture 100, according to at least one embodiment. The system architecture 100 (also referred to as "system" herein) can include a computing device 102, one or more client devices 106A-N (collectively and individually referred to as client device 106 herein), and/or one or more data stores 112 (collectively and individually referred to as data store 112 herein, each connected by network 110. It should be noted that system 100 can additionally or alternatively include other components (e.g., one or more server machines, etc.) connected to computing device 102, client device 106, data store 112, etc. via network 110. In implementations, network 110 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some embodiments, data store 112 is a persistent storage that is capable of storing data as well as data structures to tag, organize, and index the data. Data store 112 can be hosted by one or more storage devices, such as main memory, magnetic or optical storage based disks, tapes or hard drives, NAS, SAN, and so forth. In some implementations, data store 112 can be a network-attached file server, while in other embodiments data store 112 can be some other type of persistent storage such as an object-oriented database, a relational database, and so forth, that may be hosted by computing device 102 or one or more different machines coupled to the computing device 102 via network 110.

Computing device 102 may be a desktop computer, a laptop computer, a smartphone, a tablet computer, a server, or any suitable computing device capable of performing the techniques described herein. In some embodiments, computing device 102 may be a computing device of a cloud computing platform. For example, computing device 102 may be, or may be a component of, a server machine of a cloud computing platform. In such embodiments, computing device 102 may be coupled to one or more edge devices (not shown) via network 110. An edge device refers to a computing device that enables communication between computing devices at the boundary (e.g., interface) between two networks. For example, an edge device may be connected to computing device 102, client device 106, and/or data store 112 via network 110, and may be connected to one or more endpoint devices (not shown) via another network. In such example, the edge device can enable communication between computing device 102, client device 106, and/or data stores 112, and the one or more endpoint devices. In other or similar embodiments, computing device 102 may be, or may be a component of, an edge device. For example, computing device 102 may facilitate communication between data stores 112 and/or client device 106, which are connected to computing device 102 via network 110, and client device 106 (or one or more other user devices and/or other computing devices) that are connected to computing device 102 via another network.

Client device 106 can include any computing device 102 that enables users to access features of an application. For example, client device 106 may be, or may be a component of, devices such as, but not limited to: televisions, smart phones, cellular telephones, personal digital assistants (PDAs), portable media players, netbooks, laptop computers, electronic book readers, tablet computers, desktop computers, set-top boxes, gaming consoles, autonomous vehicles, surveillance devices, and the like. In some embodiments, computing device 102 may be an edge device that connects client device 106 to data store 112 and/or other components of system 100. In other or similar embodiments, computing device 102 may not connect client device 106 to data store 112 and/or other components, and instead may provide client device 106 with data obtained by computing device 102 (e.g., from data store 112). In additional or alternative embodiments, computing device 102 and client device 106 may be the same device and/or share the same or similar components.

Client device 106 can include one or more hardware components, in some embodiments. As illustrated in FIG. 1, client device 106A can include one or more processors 120 (collectively and individually referred to as processor 120 herein), a memory 124, one or more input/output (IO) devices 126, and/or other components. Processor 120 can include one or more processing units 122. A processing unit refers to a component that performs logical and/or arithmetical operations on data. In some embodiments, processing units 122 can include one or more central processing units (CPUs) and/or one or more graphical processing units (GPUs). A GPU can include any processing unit that is specially designed to accelerate graphics rendering (e.g., for applications 132 running via client device 106). As illustrated in FIG. 1, processor 120 can include multiple processing units. In some embodiments, processor 120 can be or can otherwise correspond to a multi-core processor. A multi-core processor refers to a processor on a single integrated circuit with two or more separate processing units. Each processing unit of a multi-core processor can read and execute instructions, as described herein. It should be noted that although some embodiments describe processor 120 as a multi-core processor, embodiments of the present disclosure can be applied to any type of computer architecture.

In some embodiments, each physical processing unit 122 of processor 120 can be associated with a logical processing unit. A logical processing unit can be defined as a logical partition of a physical processing unit 122 so to support parallel processing by the physical processing unit 122. A logical processing unit can include a virtual construct of an operating system, (OS) of client device 106 for managing and scheduling tasks on physical processing units 122. In some instances, a logical processing unit is also referred to as a thread (e.g., thread of execution).

Memory 124 can include one or memory devices (not shown) that can store data and/or instructions that is accessible to processor 120 (e.g., via a bus, etc.). In some embodiments, memory 124 can include volatile memory devices and/or non-volatile memory devices. For example, memory 124 can include or otherwise correspond to a Dynamic Random Access Memory ("DRAM") device, a Static Random Access Memory ("SRAM") device, a flash memory device, or another memory device. I/O device 126 can include any device that enables the transfer of data between one or more components of client device 106 (e.g., processor 120, memory 124, etc.) and/or between component(s) of client device 106 and other component of system 100. For example, I/O device 126 can include a network interface card (NIC), an audio/visual device (e.g., a monitor, speakers, etc.), a storage device, a keyboard, a mouse, and so forth.

As indicated above, one or more physical devices (e.g., processor 120, memory 124, I/O device 126, etc.) can be used to support one or more virtualized systems 130A-N (collectively and individually referred to as virtualized system 130 herein) of system 100. Virtualized system 130 (also referred to as a virtual system) can include one or more portions of a virtual machine, a container, a process, and/or any other type of virtualized system. One or more applications 132 (or application instances) can run on a virtualized system 130 under a guest operating system (OS) (not shown). A virtualization manager 134 (also sometimes referred to as a hypervisor) running under an OS of client device 106 can abstract physical components of client device 106 and present this abstraction to virtualized systems 130 as one or more virtual devices. For example, virtualization manager 134 may abstract processing unit 122A of processor 120 and present this abstraction to virtualized system 130A as an abstracted (or virtual) processing unit. The guest OS can cause instructions pertaining to application 132A to execute using the virtual processing unit. Virtualization manager 134 may abstract processing unit 122A for virtualized system 130A by scheduling time slots on processing unit 122A, rather than dedicating processing unit 122A for virtualized system 130A, in some embodiments. In one or more embodiments, virtualization manager 134 can abstract one or more logical processing units (e.g., threads), as described above, and present the abstracted logical processing units to virtualized system 130 as a virtual processing unit, as described above.

In other or similar embodiments, virtualization manager 134 may abstract a portion of memory 124 and present this abstraction to a virtualized system 130 as abstracted memory. Virtualization manager 134 may abstract memory 124 by employing a page table for translating memory access for the abstracted memory with physical memory addresses of memory 124. During runtime of application 132 using virtualized system 130, virtualization manger 134 may intercept virtual memory access operations (e.g., read operations, write operations, etc.) and may translate a virtual memory address associated with the intercepted operations to a physical memory address at memory 124 using the page table. In additional or alternative embodiments, virtualization manager 134 may abstract one or more I/O devices 126 at client device 106 and present this abstraction to virtualized system 130 as one or more respective abstracted I/O devices. Virtualization manager 134 may abstract an I/O device 126 by assigning particular port ranges of an interface slot of the I/O device 126 to virtualized system 130 and presenting the assigned port ranges as an abstracted I/O device. A guest OS may utilize an abstracted processing unit, abstracted memory, and/or one or more abstracted I/O devices to support execution of one or more applications 132 on virtualized system 130.

As illustrated in FIG. 1, system 100 can include a processing unit testing engine 151 that is configured to facilitate testing of one or more processing units 122 of a processor 120 of a client device 106. In some embodiments, testing of a processing unit 122 can involve performing operations of a testing process. The operations can include one or more logical operations that cause a processing unit 122 under test to perform operations to access and/or process data and provide feedback (e.g., an outcome) of the operations. Processing unit testing engine 151 can analyze the provided feedback to determine a performance of the processing unit 122 (e.g., an efficiency of the processing unit 122, an availability of the processing unit 122, etc.). In some embodiments, the testing process can correspond to a testing protocol designed or otherwise provided for client device 106. For example, client device 106 can be included at or otherwise be accessible to a safety critical system (e.g., an autonomous driving system, etc.). The testing process can include one or more operations that test a performance of processing units 122 of client device 106 (e.g., according to safety and efficacy standards pertaining to the safety critical system). In some embodiments, processing unit testing engine 151 can perform the testing process while processor 120 is online (e.g., made available for operations of application 132). Further details regarding processing unit testing engine 151 and performing a testing process for an online processor 120 are provided herein.

In some embodiments, processing unit testing engine 151 can reside at computing device 102. As indicated above, computing device 102 can include computing resources (e.g., of a server machine, etc.) that is accessible to client device 106 (e.g., via network 110). In other or similar embodiments, processing unit testing engine 151 can be a component of virtualization manager 134 of client device 106. In yet other or similar embodiments, processing unit testing engine 151 can be a component of another engine or component of client device 106 and/or any other device or system of system architecture 100, as described herein.

In some embodiments, computing device 102 and/or client device 106 may include a processing unit assignment engine 151. Processing unit assignment engine 151 may be configured to assign execution of one or more portions of an application to various processing units of client device 106. As described above, client device 106 can include one or more iGPUs and one or more dGPUs, in some embodiments. Processing unit assessment engine 151 can assign one or more portions of an application (e.g., or all portions of an application) to be executed using the one or more iGPUs and/or the one or more dGPUs. It should be noted that although some embodiments of the present disclosure refer to assigning an application for execution using iGPUs or dGPUs of client device 106, embodiments of the present disclosure can be applied to assign a portion of application for executing using the iGPUs or dGPUs or client device 106

(or any other type of processing unit at client device 106). For example, processing unit assessment engine 151 can assign one or more operations of the application for execution using an iGPU of client device 106 and one or more additional operations of the application for executing using a dGPU of client device 106, in accordance with embodiments of the present disclosure.

In some implementations, computing device 102, client device 106 and/or data store 112, may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable assignment of execution of an application 132 using various processing units of client device 106. It should be noted that in some other implementations, the functions of computing device 102 and/or client device 106 may be provided by a fewer number of machines. For example, in some implementations computing device 102 and/or client device 106 may be integrated into a single machine, while in other implementations, computing device 102 and/or client device 106 may be integrated into multiple machines. In addition, in some implementations one or more of computing device 102 may be integrated into client device 106. In general, functions described in implementations as being performed by computing device 102 and/or client device 106 may also be performed on one or more edge devices (not shown) and/or other client devices (not shown), if appropriate. In addition, the functionality attributed to a particular component may be performed by different or multiple components operating together. Computing device 102 and/or client device 106 may also be accessed as a service provided to other systems or devices through appropriate application programming interfaces.

Figure 2:
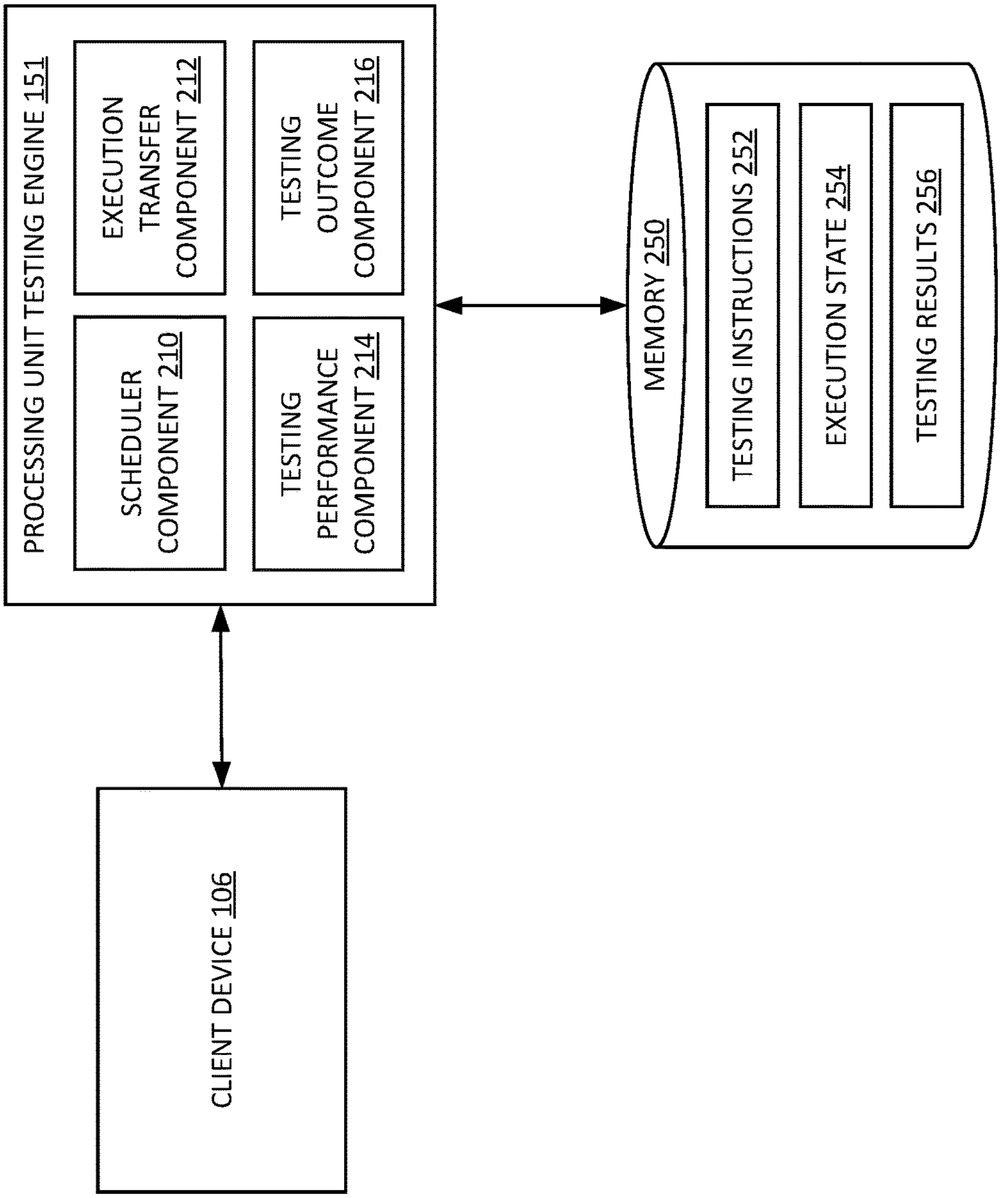
FIG. 2 is a block diagram of an example processing unit testing engine, according to at least one embodiment.

FIG. 2 is a block diagram of an example processing unit testing engine 151, according to at least one embodiment. As illustrated in FIG. 2, processing unit testing engine 151 can include a scheduler component 210, an execution transfer component 212, a testing performance component 214, and/or a testing outcome component 216. As described above, processing unit testing engine 151 can reside at client device 106. In other or similar embodiments, processing unit assignment engine 151 can reside at computing device 102 and/or at another component of system 100. Processing unit testing engine 151 can be connected to a memory 250. In some embodiments, memory 250 can include one or more regions of data store 112. In yet other or similar embodiments, memory 250 can include regions of other memory that is accessible to one or more of client device 106, computing device 102, and/or one or more other components of system 100. Further details regarding components of processing unit assignment engine 151 are described herein with respect to FIG. 3.

Figure 4A:
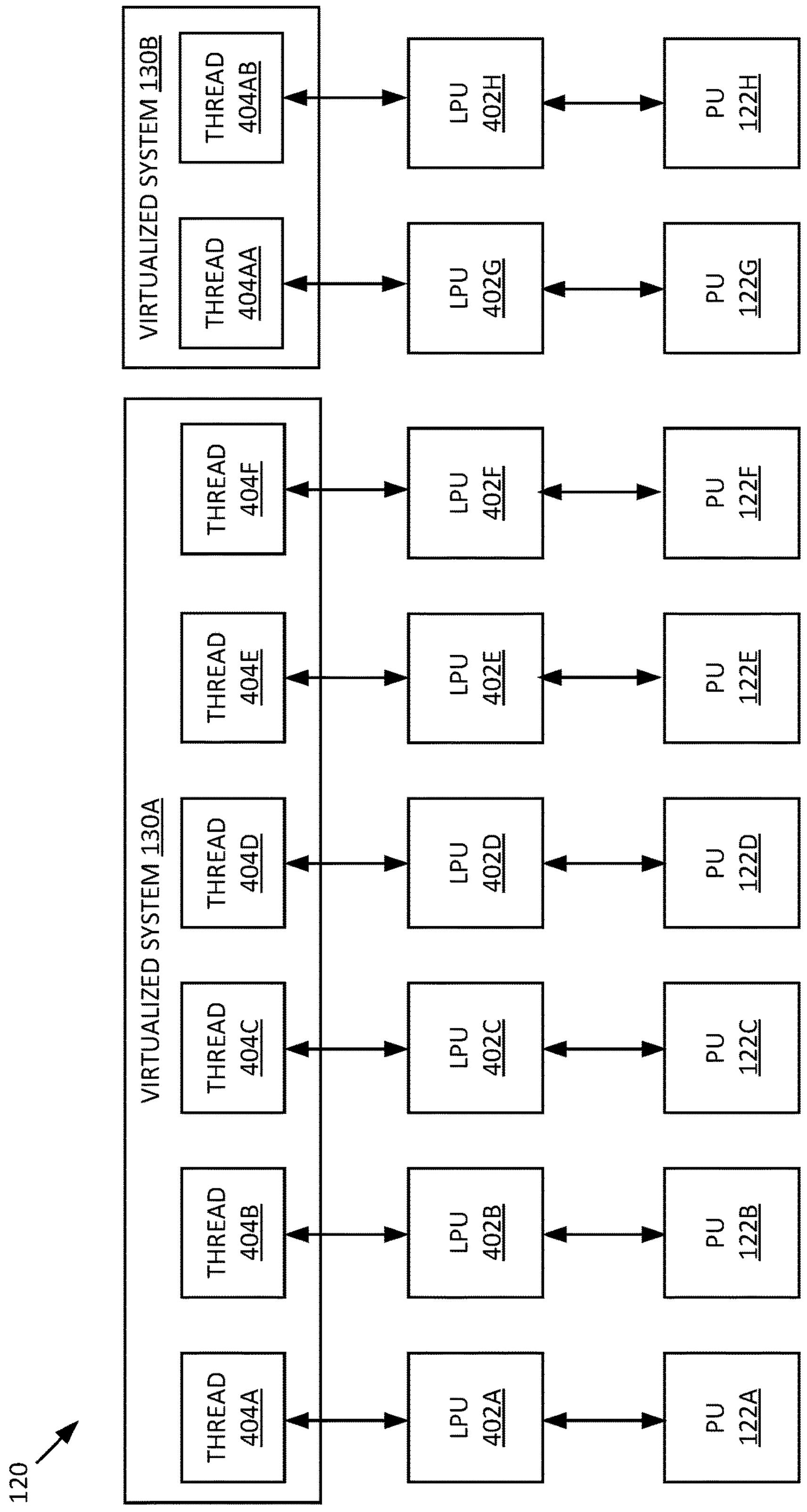
FIGS. 4A-4E illustrate examples of testing processing units of a computing system, according to at least one embodiment.

As described above, client device 106 can include one or more processors 106. A processor 120 can be a multi-core processor, or another such processor, that includes multiple processing units 122, in some embodiments. FIG. 4A illustrates an example processor 120, in accordance with at least one embodiment of the present disclosure. As illustrated in FIG. 4A, processor 120 can include multiple processing units 122 (noted as PU herein). In an illustrative example, processor 120 can include eight PUs (e.g., PUs 122A-122H). It should be noted that processor 120 can include any number of PUs 122. Each PU 122 can be partitioned into or otherwise associated with one or more logical processing units (LPUs) 402. As indicated above, a LPU 402 can correspond to a thread of execution for operations executed using processing unit 122. It should be noted that although FIG. 4A depicts each PU 122 of processor 120 as partitioned into a single LPU 402 (e.g., PU 122A is partitioned into LPU 402A, PU 122B is partitioned into LPU 402B, etc.), PUs 122 can each be partitioned into any number of LPUs 402. It should also be noted that LPUs 402 can be associated with multiple PUs 122, in additional or alternative embodiments.

As described with respect to FIG. 1, virtualization manager 134 can abstract computing resources (e.g., PU 122, LPU 402, etc.) of a client device 106 and can present the abstracted resources as virtualized resources to a virtualized system 130 running via a client device 106. For example, virtualization manager 134 can abstract one or more PUs 122 and/or LPUs 402 and can present the abstracted PUs as virtual processing units (VPUs) 404 to a virtualized system 130. In accordance with the example depicted in FIG. 4A, virtualization manager 134 can abstract PUs 122A-F and/or LPUs 402A-F and can present the abstracted PUs 122 and/or LPUs 402 as VPUs of virtualized system 130A. Additionally or alternatively, virtualization manager 134 can abstract PUs 122G-H and/or LPUs 402G-H and present the abstracted PUs 122G-H and/or LPUs 402G-H as VPUs of virtualized system 130B. As described above, a virtualized system 130 can execute operations of one or more applications 132 (or application instances) via virtual resources abstracted for the virtual system. Each application 132 can include or otherwise be associated with one or more application threads 404 that correspond to tasks pertaining to the application 132 (or application instance). VPUs of a virtualized system 130 can execute operations associated with a task of a particular application thread 404, in some embodiments. In such embodiments, the under LPUs 402 and/or PUs 122 associated with the VPUs execute operations associated with the application thread 404. In accordance with the example depicted in FIG. 4A, VPUs associated with LPU 402A and/or PU 122A can be allocated to execute operations associated with thread 404A, VPUs associated with LPU 402B and/or PU 122B can be allocated to execute operations associated with thread 404B, and so forth.

Figure 3:
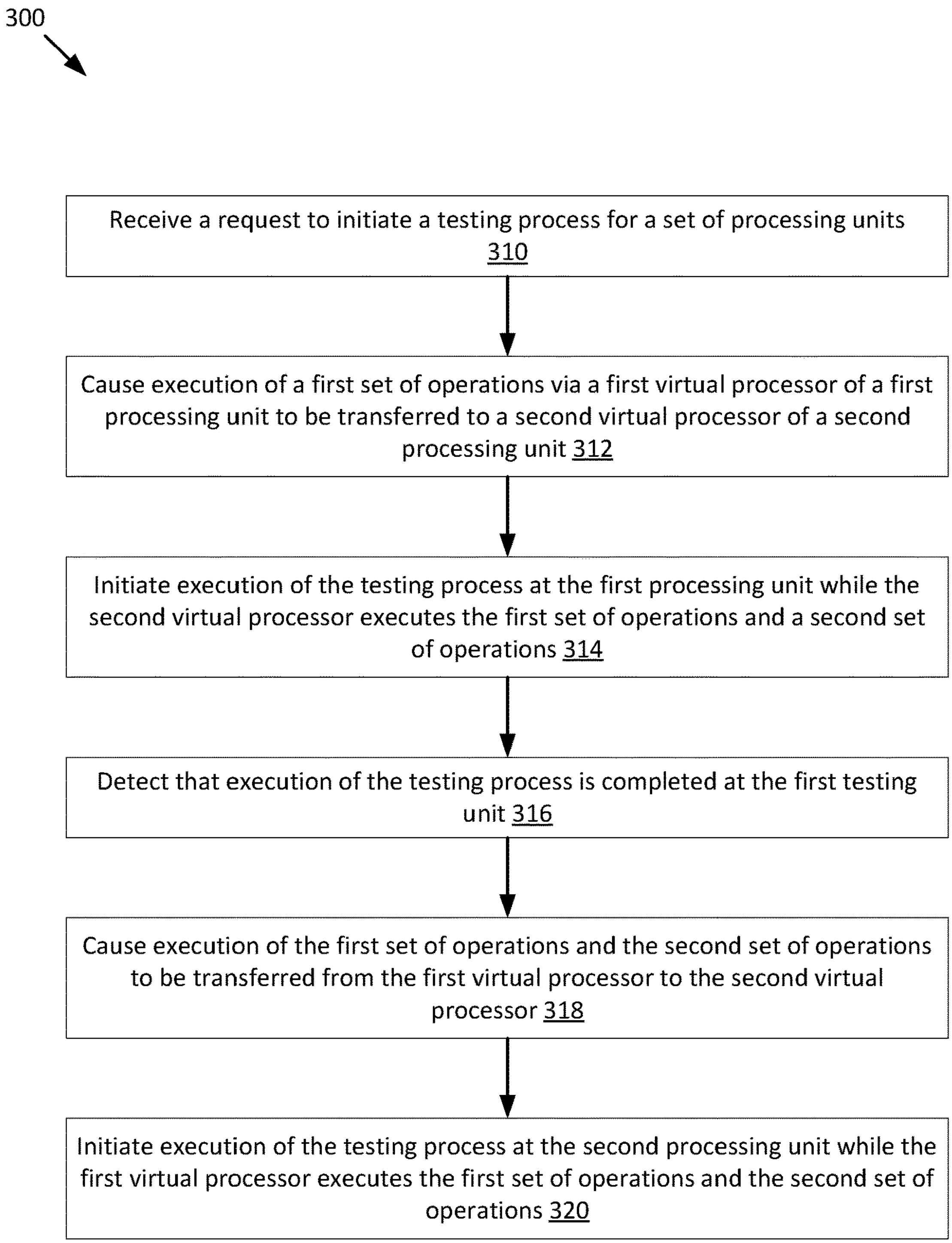
FIG. 3 illustrates a flow diagram of an example method for online fault detection in safety critical systems using isolation and process migration, according to at least one embodiment.

FIG. 3 illustrates a flow diagram of an example method 300 for online fault detection in safety critical systems using isolation and process migration, according to at least one embodiment. In at least one embodiment, method 300 may be performed by computing device 102, client device 106, one or more edge devices, one or more endpoint devices, or some other computing device, or a combination of multiple computing devices. Method 300 may be performed by processing logic of one or more processing units (e.g., CPUs and/or GPUs), which may include (or communicate with) one or more memory devices. In at least one embodiment, method 300 may be performed by multiple processing threads (e.g., CPU threads and/or GPU threads), each thread executing one or more individual functions, routines, subroutines, or operations of the method. In at least one embodiment, processing threads implementing method 300 may be synchronized (e.g., using semaphores, critical sections, and/or other thread synchronization mechanisms). Alternatively, processing threads implementing method 300 may be executed asynchronously with respect to each other. Various operations of method 300 may be performed in a different order compared with the order shown in FIG. 3. Some operations of the methods may be performed concurrently with other operations. In at least one embodiment, one or more operations shown and/or described with respect to FIG. 3 may not always be performed.

At block 310, processing logic receives a request to initiate a testing process for a set of processing units. In some embodiments, processing unit testing engine 151 can receive the request to initiate the testing process. The request can be received from a component of computing device 102 and/or client device 106 according to a testing protocol for PUs 122 of client device 106, in some embodiments. In other or similar embodiments, the request can be received from another device of system 100 (e.g., associated with a system administrator). In some embodiments, the testing process can be a fault detection process. Processing unit testing engine 151 can determine, based on the performance of the testing process at each of the set of PUs, whether a fault occurred at a respective PU. A fault refers to an error or failure occurring during execution of one or more operations by the PU. Examples of a fault include, but are not limited to, a failure by the PU to initiate and/or complete execution of the one or more operations, an incorrect or unexpected outcome of execution of the one or more operations, and so forth. In some embodiments, the testing process can include one or more testing instructions 252 that correspond to testing operations for execution by PUs 122 during the testing process. The testing operations can include operations that are specifically selected or designed to detect a fault at a PU. In some embodiments, a system administrator or operator can provide testing instructions 252 to processing unit testing engine 151 (e.g., via a user device associated with the system administrator or operator). In other or similar embodiments, processing unit testing engine 151 (or another component of system 100) can determine and/or generate testing instructions based on historical activity of processor 120 and/or client device 106 in system 100. As illustrated by FIG. 2, testing instructions 252 can be stored at memory 250, in some embodiments.

Scheduler component 210 of processing unit testing engine 151 can schedule performance of one or more operations of testing instructions 252 by one or more PUs 122 of processor 120. In some embodiments, testing instructions 252 can indicate one or more PUs 122 that are subject to the testing process. In other or similar embodiments, scheduler component 210 can determine the PUs 122 that are subject to the testing process based on a testing protocol for system 100 and/or client device 106, as described above. PUs 122 that are subject to a testing process can be online during a time period during which the request to perform the testing process is received, in some embodiments. In some embodiments, scheduler 210 can identify a PU 122 to initiate the testing process. In such scenarios, PU 122 can be taken offline (e.g., made unavailable to execute operations pertaining to threads 404 of one or more applications 132) while other PUs 122 of the processing unit will remain online, as described herein. In some embodiments, scheduler 210 can identify the PU 122 to initiate the testing process based on the testing instructions 252 and/or the testing protocol, as described above. In other or similar embodiments, scheduler 210 can access an operation queue associated with each PU 122 that is subject to the testing process and can identify the PU 122 having the operation queue that satisfies one or more criteria. For example, scheduler 210 identify the PU 122 having an operation queue that includes a number of operations to be executed that fall below a threshold and/or is lower than a number of operations of operation queues of other PUs 122. In another example, scheduler 210 can identify the PU 122 having an operation queue that does not include any operations that are critical to a safety or functionality of system 100. In response to identifying the PU 122 to initiate the testing process, scheduler 210 can provide a notification of the identified PU 122 to execution transfer component 212. As illustrated with respect to FIG. 4B, scheduler 210 can identify PU 122H to initiate the testing process.

Referring back to FIG. 3, at block 312, processing logic causes execution of the first set of operations via a first virtual processor of a first processing unit to be transferred to a second virtual processor of a second processing unit. As described above, scheduler 210 can identify PU 122H to initiate the testing process and can provide an indication of PU 122H to execution transfer component 212. In response to receiving the indication, execution transfer component 212 can cause execution of the operations of the thread 404 (e.g., thread 404AB) by a VPU associated with PU 122H to be transferred to for execution by another VPU associated with another PU 122. In some embodiments, execution transfer component 212 can identify the other VPU based on the VPUs abstracted for virtualized system 130B. For example, execution transfer component 212 can determine (e.g., based on information associated with virtualized system 130B) that virtualized system 130B includes VPUs abstracted from LPUs 402H and 402G. Execution transfer component 212 can determine that LPU 402H is associated with PU 122H (e.g., the PU 122 under test) and therefore can select LPU 402G (e.g., associated with PU 122G that is not currently under test) to transfer execution of operations associated with thread 404AB. In some embodiments, execution transfer component 212 may determine that virtualized system 130B does not include any additional VPUs that are abstracted from LPUs 402 associated with PUs 122 that are not under test. In such embodiments, execution transfer component 212 may identify VPUs of another virtualized system 130A supported by processor 120 to transfer execution of operations associated with thread 404AB. Execution transfer component 212 may identify VPUs of virtualized system 130A for transfer by determining which VPUs are abstracted from PUs that satisfy the one or more criteria (e.g., have a number of operations in an operation queue that falls below the threshold number and/or is lower than a number of operations of other operation queues, etc.), in some embodiments. Execution transfer component 212 can identify VPUs of the virtualized system 130A for transfer by determining a VPU that is included next in a sequence of PUs for testing per testing instructions 252 and/or the testing protocol, in other or similar embodiments. In yet other or similar embodiments, execution transfer component 212 can identify VPUs of virtualized system 130A according to other techniques.

Figure 4B:
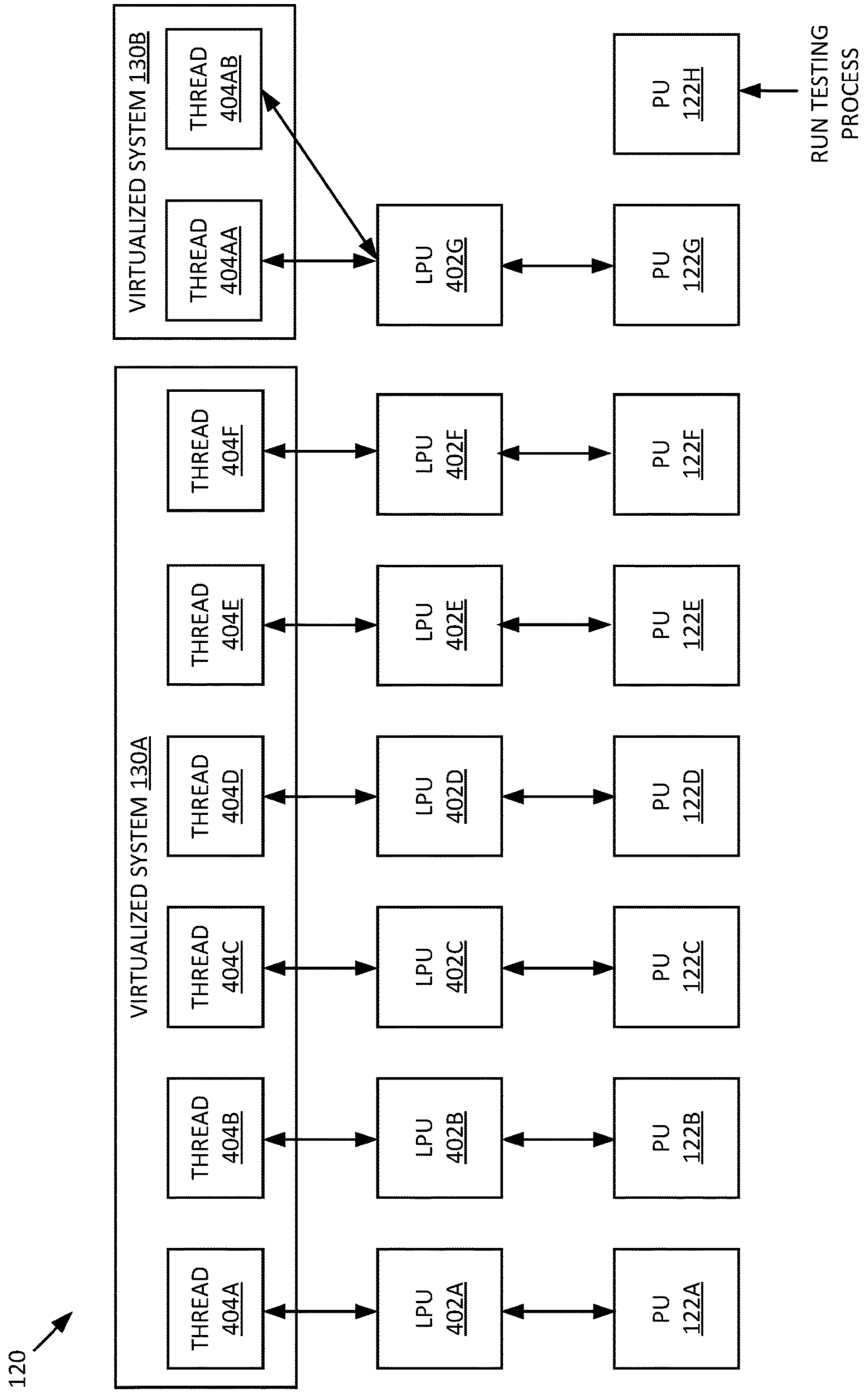

In accordance with the example illustrated by FIG. 4B, execution transfer component 212 can identify or otherwise select VPUs associated with LPU 402G and/or PU 122G for execution of the operations pertaining to thread 404AB while the testing process is performed for PU 122H. In some embodiments, execution transfer component 212 can cause the execution of the operations pertaining to thread 404AB (e.g., the first set of operations) to be transferred from the VPUs associated with LPU 402H (e.g., the first virtual processor) to the VPUs associated with LPU 402G (e.g., second virtual processor) by transmitting an instruction to virtualization manager 134. Upon receiving the instruction, virtualization manager 134 can stop execution of operations via VPUs of LPU 402H (e.g., by issuing a termination instruction to the VPUs). In additional or alternative embodiments, virtualization manager 134 and/or execution transfer component 212 can obtain a state of operations executing via the VPUs and/or a state of operations in an operation queue associated with the VPUs and can store the obtained state at memory 250 as execution state 254, in some embodiments. Execution state 254 can indicate the operations executing via VPUs of LPU 402H, a current or prior outcome of operations executing via the VPUs and/or in the operation queue, an ordering of operations in the operation queue for the VPUs, and so forth. Virtualization manager 134 can update an operation queue associated with the VPUs of LPU 402G to include one or more operations pertaining to thread 404AB based on the obtained execution state 254. In some embodiments, virtualization manager 134 can update the operation queue associated with the VPUs of LPU 402G to include the operation that was being executed via VPUs of LPU 402H when the execution of operations via the VPUs was stopped. Virtualization manager 134 can additionally or alternatively update the operation queue associated with the VPUs of LPU 402G to include operations of the operation queue associated with the VPUs of LPU 402G. In some embodiments, the operation queue associated with the VPUs of LPU 402G can also include operations pertaining to thread 404AA, as described herein. Virtualization manager 134 can update the operation queue associated with the VPUs of LPU 402G such that an ordering of the operations pertaining to thread 404AA and 404AB corresponds to an operation priority protocol associated with processor 120 (e.g., operations are ordered based on criticality, time period during which operations were received from application 132, etc.). Upon transfer of execution of the operations pertaining to thread 404AB from VPUs of LPU 402H to VPUs of LPU 402G, the VPUs of LPU 402G can execute operations pertaining to both thread 404Ab and 404AA.

Referring back to FIG. 3, at block 314, processing logic initiates execution of the testing process at the first processing unit while the second virtual processor executes the first set of operations (e.g., pertaining to thread 404AB) and a second set of operations (e.g., pertaining to thread AA). Testing performance component 214 can initiate the testing process at PU 122H by executing testing instructions 252 at PU 122H. Testing outcome component 216 can obtain one or more outcomes of the testing process, in some embodiments. An outcome of the testing process can include one or more signals received or otherwise obtained for PU 122H before, during, or after execution of the testing instructions 252. The signals can include signals issued by PU 122H during performance of the test (e.g., to obtain data from memory 124, to transmit or receive data via I/O device 126, etc.) and/or signals detected by one or more sensors for PU 122H (e.g., temperature sensors, voltage sensors, etc.). In additional or alternative embodiments, an outcome of the testing process can include a value, data item, or other such type of output of one or more functions of the operations of testing process.

At block 316, processing logic detects that execution of the testing process is completed at the first testing unit. In some embodiments, testing performance component 214 and/or testing outcome component 216 can detect that execution of the testing process is completed at the first testing unit (e.g., PU 122H) by determining that PU 122H has successfully executed each operation of testing instructions 252. In other or similar embodiments, testing performance component 214 and/or testing outcome component 216 can detect that execution of the testing process is completed by determining that PU 112H has terminated execution of the operations of testing instructions 252 and/or is unable to complete execution of the operations. In some embodiments, testing outcome component 216 can generate testing results 256 indicating results of the testing process based on the testing outcomes described with respect to block 314. Testing results 256 can indicate whether the testing process was successfully completed (e.g., each operation of testing instructions 252 was performed and an expected outcome of the testing instructions 252 was obtained), was unsuccessfully completed (e.g., each operation of testing instructions 252 was performed and an unexpected outcome of the testing instructions 252 was obtained), and/or was not completed (e.g., each operation of testing instructions 252 was not performed). In some embodiments, testing outcome component 216 can generate testing results 252 based on outcomes for the testing process performed for each PU 122 under test (e.g., PU 122H, PU 122G, etc.). In some embodiments, testing outcome component 216 can provide testing results 256 to a device associated with a system administrator for presentation to the system administrator. In other or similar embodiments, testing outcome component 216 can provide testing results 256 to another component of system 100 (e.g., residing at computing device 102 or elsewhere within system 100). The other component may perform one or more operates to address one or more faults indicated by testing results 256, in some embodiments.

Figure 4C:
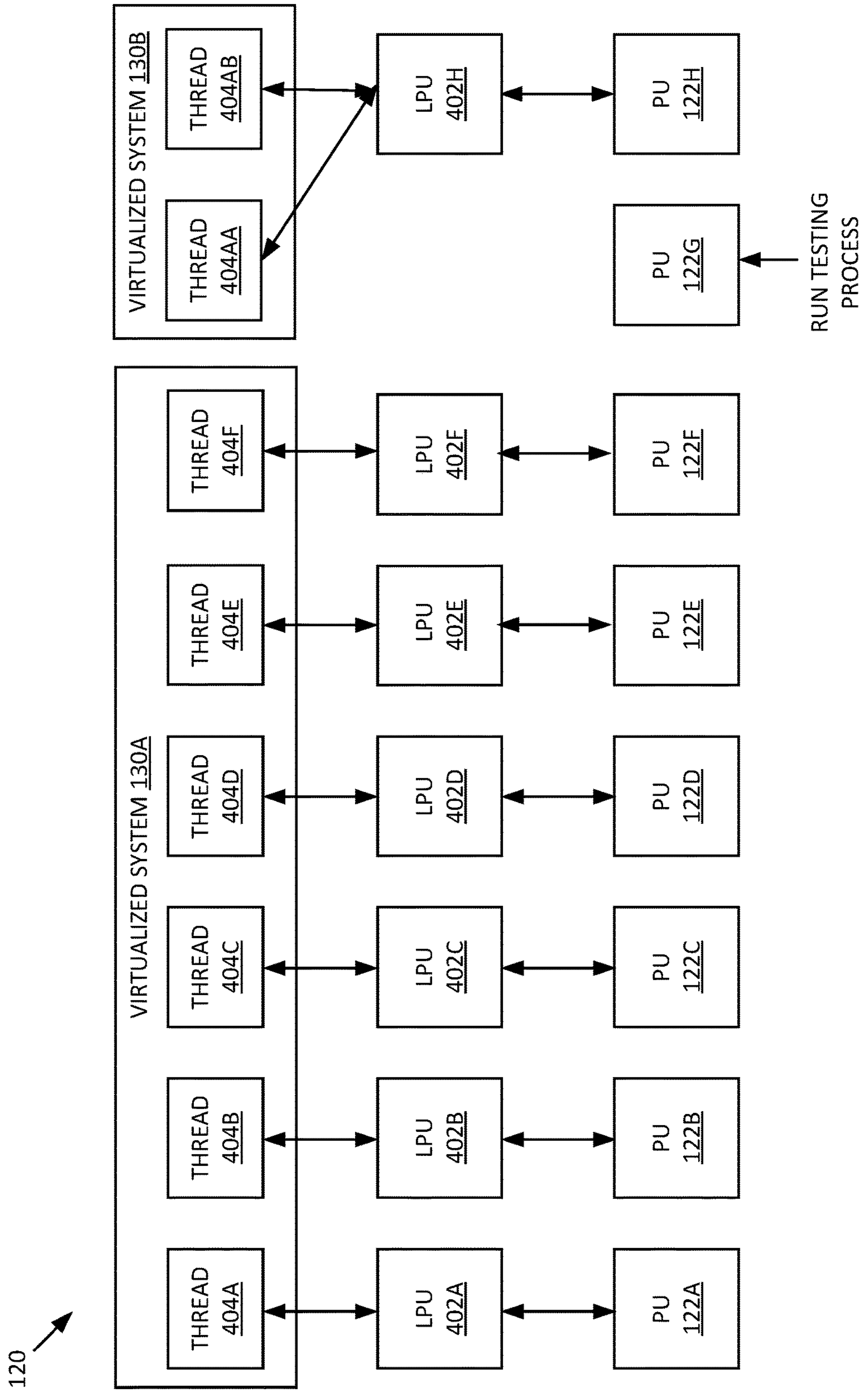

Referring back to FIG. 3, at block 318, processing logic causes execution of the first set of operations and the second set of operations to be transferred from the second virtual processor to the first virtual processor. As described above, execution transfer component 212 of processing unit testing engine 151 can select or otherwise identify VPUs to transfer the execution of operations pertaining to thread 404AA and/or 404AB while the testing process is performed for PU 122G. Execution transfer component 212 can select and/or identify the VPUs according to previously described embodiments. In accordance with the example illustrated by FIG. 4C, execution transfer component 212 can select VPUs of LPU 402H to transfer execution of the operations pertaining to thread 404AA and thread 404AB. Execution transfer component 212 can cause execution of the operations to VPUs for LPU 402H by transmitting an instruction to virtualization manager 134 to transfer execution of the operations, as described above.

At block 320, processing logic initiates execution of the testing process at the second processing unit while the first virtual processor executes the first set of operations and the second set of operations. As illustrated with respect to FIG. 4C, testing performance component 214 can execute testing instructions 252 at PU 122G, as described above. VPUs of LPU 402H can execute the operations of thread 404AA and 404AB as the testing instructions 252 are executing, as described above. Testing outcome component 216 can obtain outcomes of the testing process performed at PU 122G and generate testing results 256, in accordance with previously described embodiments.

Figure 4D:
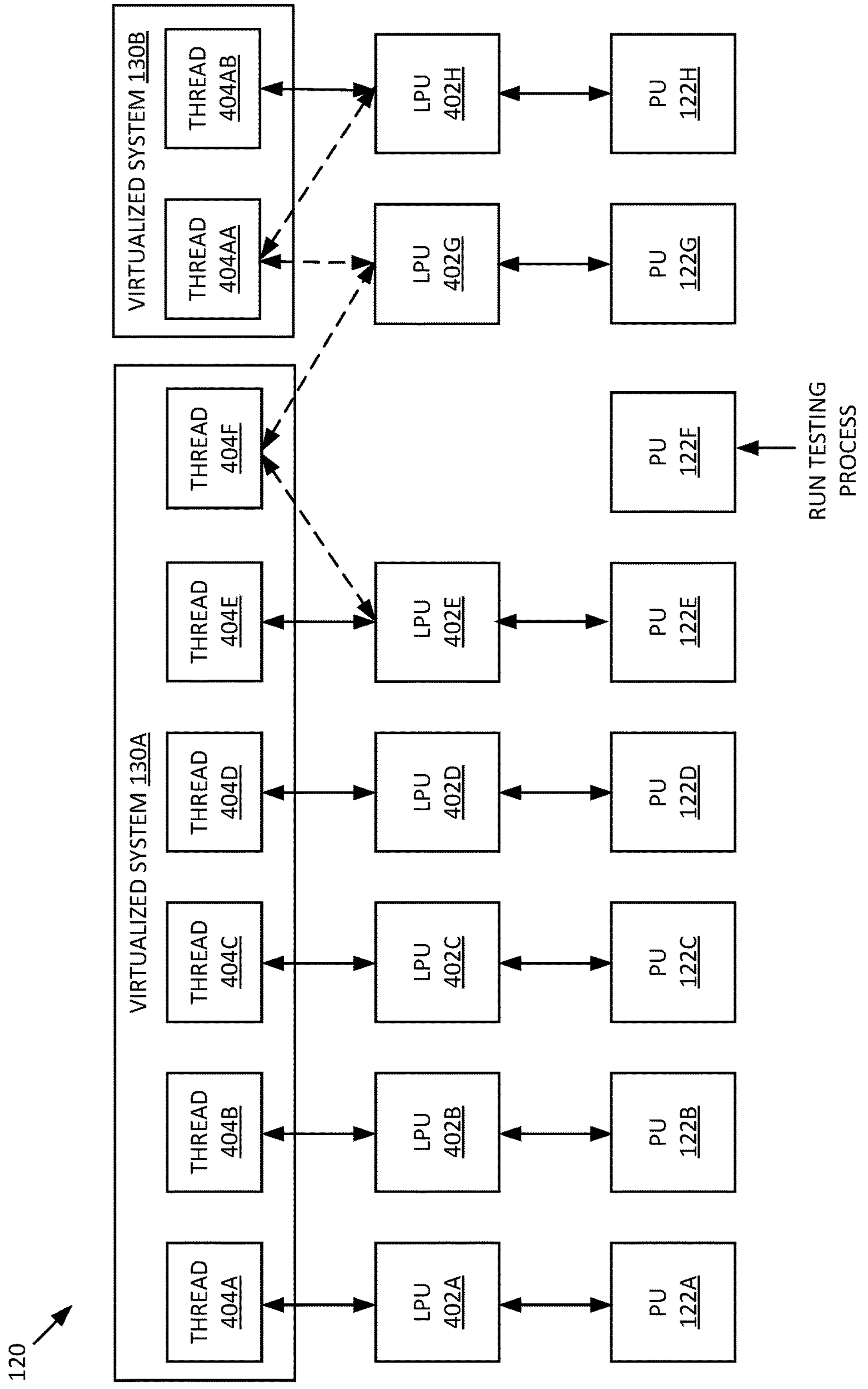

Processing unit testing engine 151 can perform the testing process for each PU 122 of processor 120 that is to be tested per the received request. As described above, in some embodiments, processing unit testing engine 151 can transfer operations executed by VPUs of a virtualized system 130 to other VPUs of the virtualized system 130. For example, as illustrated in FIG. 4D, execution of operations pertaining to thread 404F of virtualized system 130A can be transferred to other VPUs associated with virtualized system 130A (e.g., VPUs of LPU 402E). In other or similar embodiments, processing unit testing engine 151 can transfer operations by VPUs of a virtualized system 130 to VPUs of another virtualized system 130. In another example, as illustrated in FIG. 4D, execution of operations pertaining to thread 404F of virtualized system 130A can be transferred to VPUs of LPU 402G associated with virtualized system 130B. The selection of the VPUs for transfer of execution of the operations can be performed according to above described embodiments and/or per an isolation protocol associated with each virtualized environment 130 of client device 106. In some embodiments, the execution of operations transferred to VPUs during the testing process can be maintained until the testing process is completed. For example, operations pertaining to thread 404AA can be executed using VPUs of LPU 402H until the testing process is completed. Upon completion of the testing process, execution of the operations pertaining to thread 404AA can be transferred back to VPUs of LPU 402G, in accordance with previously described embodiments. In other or similar embodiments, processing unit testing engine 151 can transfer execution of operations pertaining to thread 404AA back to VPUs of LPU 402G upon completion of the testing process at PU 122G (e.g., but prior to completion of the testing process at other PUs 122 of processor 120).

Figure 4E:
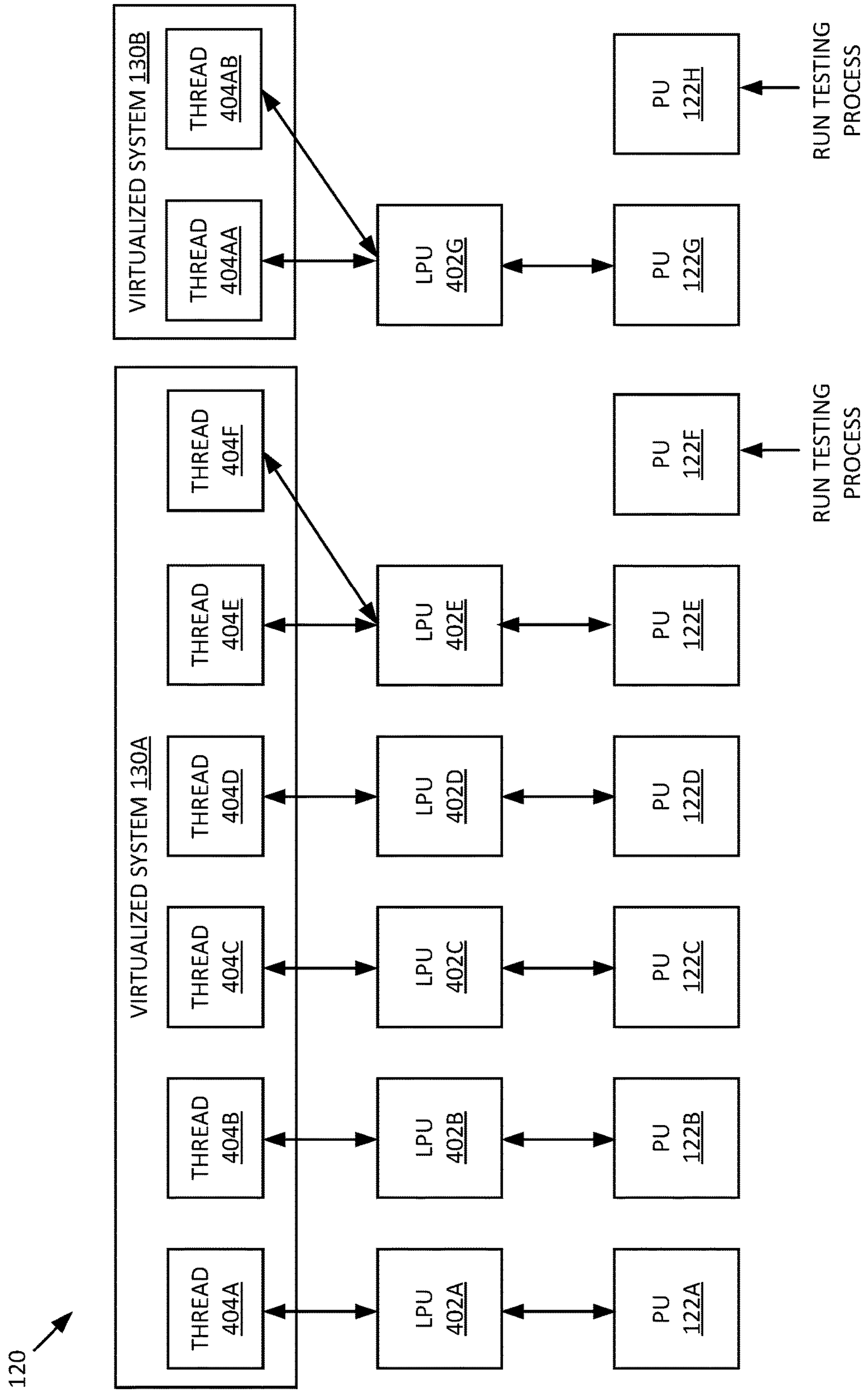

In some embodiments, a virtualized system 130 of a client device 106 can be associated with an isolation protocol that prohibits the execution of operations associated with applications running via VPUs of the virtualized system 130 by VPUs of other virtualized systems 130 of client device 106. For example, an isolation protocol associated with virtualized system 130A can prohibit the execution of operations associated with threads 404A-404F to execute using VPUs of virtualized system 130A. In such embodiments, processing unit testing engine 151 can identify VPUs of each virtualized system 130 of client device 106 to initiate the testing process, as described above, and can initiate the testing process at each of the identified VPUs (e.g., simultaneously. For example, as illustrated in FIG. 4E, processing unit testing engine 151 can initiate testing for PU 122H (supporting virtualized system 130B) and PU 122F (supporting virtualized system 130A) simultaneously, in accordance with embodiments of the present disclosure.

Figure 5A:
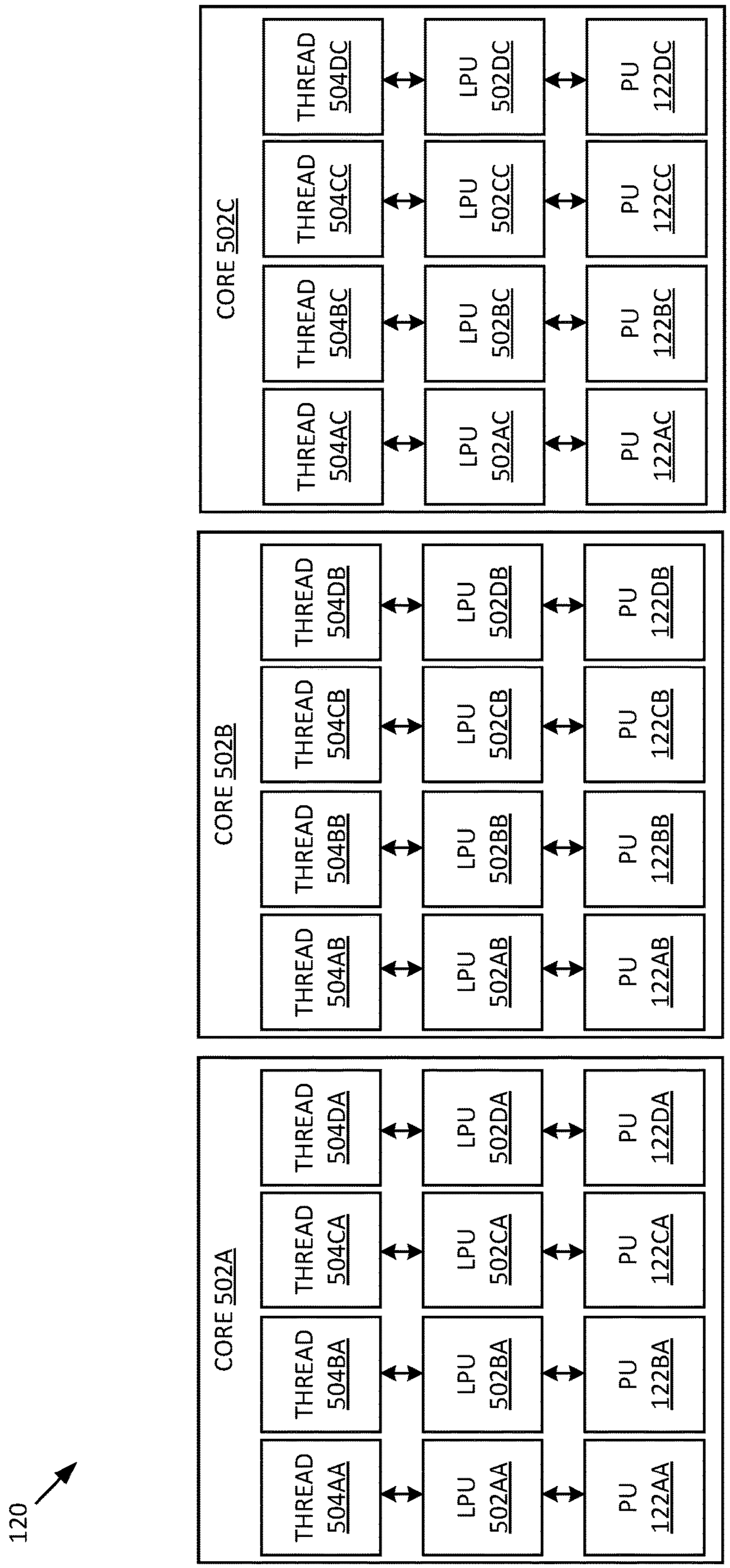
FIGS. 5A-5B illustrate additional examples of testing processing units of a computing system, according to at least one embodiment.
Figure 5B:
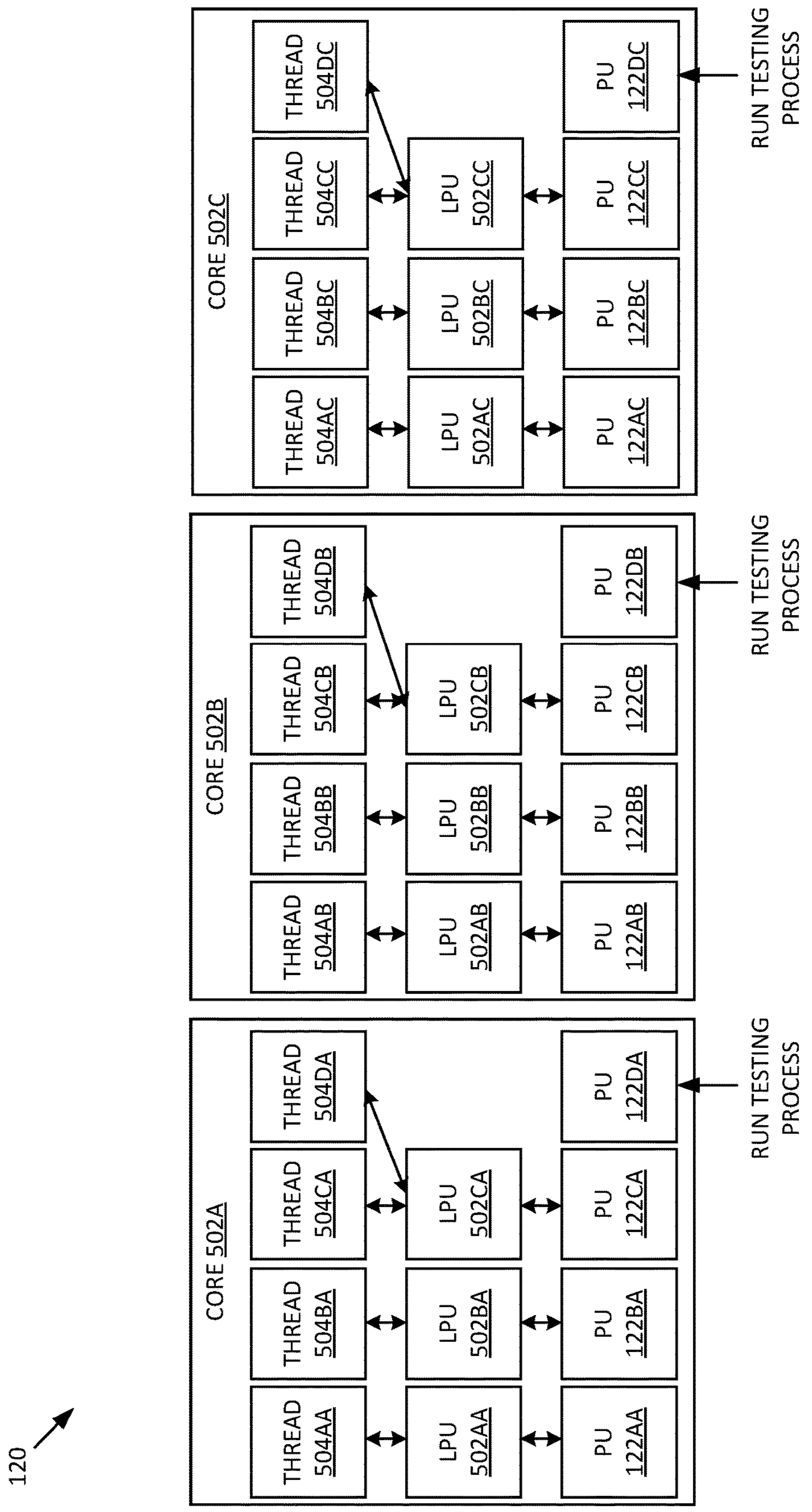

FIGS. 5A-5B illustrate additional examples of testing processing units of a computing system, according to at least one embodiment. In some embodiments, PUs 122 of a processor 120 can be organized in cores 502, as illustrated by FIG. 5A. For example, core 502A can include PUs 122AA-DA, core 502B can include PUs 122AB-DB, and/or core 502C can include PUs 122AC-DC. Each PU 122 of a core 502 can share a common integrated circuit, in some embodiments. As depicted with respect to FIGS. 5A-5B, processing unit testing engine 151 can select a PU 122 to initiate testing for each core and can perform the testing process according to techniques described above at each core. In some embodiments, processing unit testing engine 151 can perform the test process at PUs 122 of each core 502 of processor 120 simultaneously, as illustrated by FIG. 5B.

As described above, the testing process for PUS 122 can be performed by transferring execution of operations by VPUs supported by PUs 122 to other PUs 122 (e.g., that are not under test) until each PU 122 is tested. However, in additional or alternative embodiments, the testing process can be performed by transferring the VPUs between PUs. In an illustrative example, processing unit testing engine 151 can receive a request to initiate a testing process, as described above. In accordance with testing instructions 252 for the testing process, scheduler 210 can identify PU 122H to initiate the testing process. Execution transfer component 212 can transfer (e.g., migrate) the VPU supported by PU 122H from PU 122H to PU 122G. During performance of the operations of the testing process at PU 122H, PU 122G can support VPUs that execute thread 404AA and thread 404AB, as described herein. Upon completion of the performance of the testing process at PU 122H, VPUs residing at PU 122G can be transferred (e.g., migrated) from PU 122G to PU 122H, or another PU 122, as described herein.

Figure 6A:
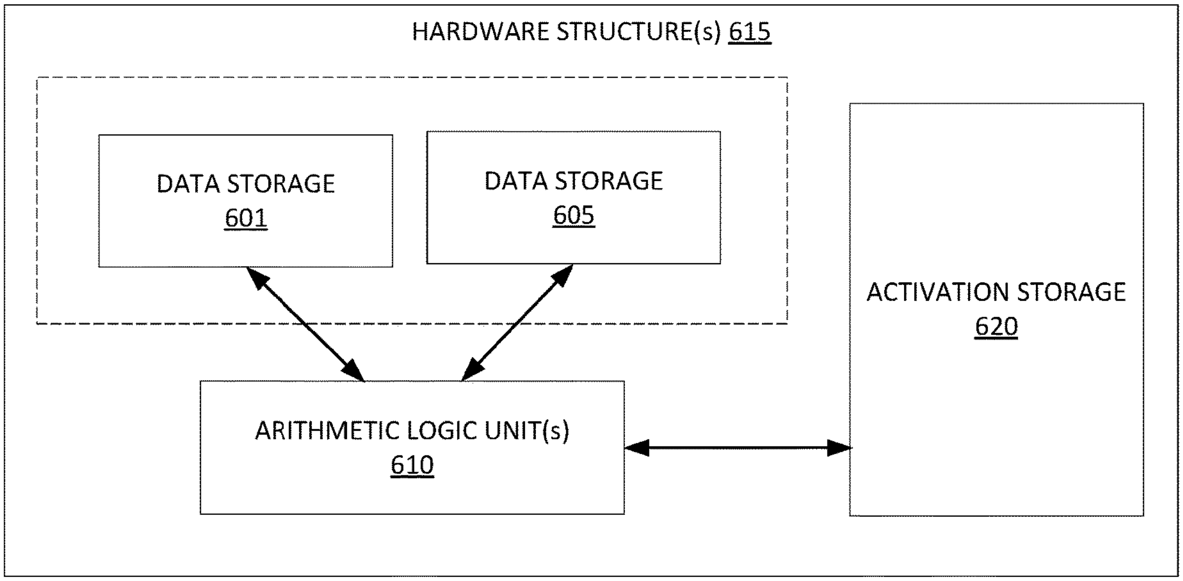
FIG. 6A illustrates example hardware structure(s) for inference and/or training logic, according to at least one embodiment.

FIG. 6A illustrates hardware structure(s) 615 for inference and/or training logic used to perform inferencing and/or training operations associated with one or more embodiments. Details regarding inference and/or training logic are provided below in conjunction with FIGS. 6A and/or 6B.

In at least one embodiment, hardware structure(s) 615 may include, without limitation, code and/or data storage 601 to store forward and/or output weight and/or input/output data, and/or other parameters to configure neurons or layers of a neural network trained and/or used for inferencing in aspects of one or more embodiments. In at least one embodiment, training logic may include, or be coupled to code and/or data storage 601 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 601 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 601 may be included with other on-chip or off-chip data storage, including a processor's L1, L2, or L3 cache or system memory.

In at least one embodiment, any portion of code and/or data storage 601 may be internal or external to one or more processors or other hardware logic devices or circuits. In at least one embodiment, code and/or code and/or data storage 601 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 601 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, hardware structure(s) 615 may include, without limitation, a code and/or data storage 605 to store backward and/or output weight and/or input/output data corresponding to neurons or layers of a neural network trained and/or used for inferencing in aspects of one or more embodiments. In at least one embodiment, code and/or data storage 605 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic may include, or be coupled to code and/or data storage 605 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 605 may be included with other on-chip or off-chip data storage, including a processor's L1, L2, or L3 cache or system memory. In at least one embodiment, any portion of code and/or data storage 605 may be internal or external to on one or more processors or other hardware logic devices or circuits. In at least one embodiment, code and/or data storage 605 may be cache memory, DRAM, SRAM, non-volatile memory (e.g., Flash memory), or other storage. In at least one embodiment, choice of whether code and/or data storage 605 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 601 and code and/or data storage 605 may be separate storage structures. In at least one embodiment, code and/or data storage 601 and code and/or data storage 605 may be same storage structure. In at least one embodiment, code and/or data storage 601 and code and/or data storage 605 may be partially same storage structure and partially separate storage structures. In at least one embodiment, any portion of code and/or data storage 601 code and/or data storage 605 may be included with other on-chip or off-chip data storage, including a processor's L1, L2, or L3 cache or system memory.

In at least one embodiment, hardware structure(s) 615 may include, without limitation, one or more arithmetic logic unit(s) ("ALU(s)") 610, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 620 that are functions of input/output and/or weight parameter data stored in code and/or data storage 601 and/or code and/or data storage 605. In at least one embodiment, activations stored in activation storage 620 are generated according to linear algebraic and or matrix-based mathematics performed by ALU(s) 610 in response to performing instructions or other code, wherein weight values stored in code and/or data storage 605 and/or code and/or data storage 601 are used as operands along with other values, such as bias values, gradient information, momentum values, or other parameters or hyperparameters, any or all of which may be stored in code and/or data storage 605 or code and/or data storage 601 or another storage on or off-chip.

In at least one embodiment, ALU(s) 610 are included within one or more processors or other hardware logic devices or circuits, whereas in another embodiment, ALU(s) 610 may be external to a processor or other hardware logic device or circuit that uses them (e.g., a co-processor). In at least one embodiment, ALUs 610 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 601, code and/or data storage 605, and activation storage 620 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 620 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 620 may be cache memory, DRAM, SRAM, non-volatile memory (e.g., Flash memory), or other storage. In at least one embodiment, activation storage 620 may be completely or partially within or external to one or more processors or other logical circuits. In at least one embodiment, choice of whether activation storage 620 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, hardware structure(s) 615 and/or inference and/or training logic illustrated in FIG. 6A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, hardware structure(s) and/or inference and/or training logic of FIG. 6A may be used in conjunction with central processing unit ("CPU") hardware, graphics processing unit ("GPU") hardware or other hardware, such as data processing unit ("DPU") hardware, or field programmable gate arrays ("FPGAs").

Figure 6B:
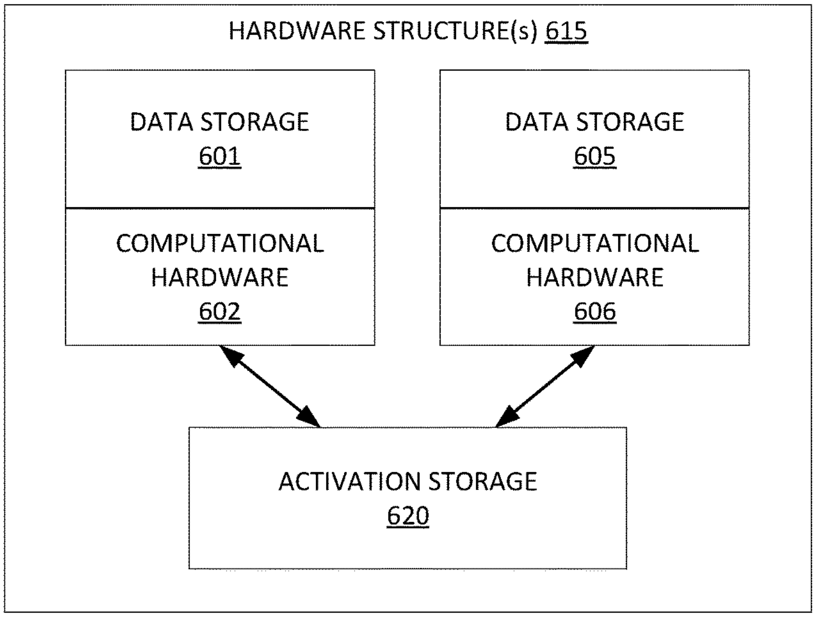
FIG. 6B illustrates example hardware structure(s) inference and/or training logic, according to at least one embodiment.

FIG. 6B illustrates hardware structure(s) 615 for inference and/or training logic, according to at least one or more embodiments. In at least one embodiment, hardware structure(s) 615 may include, without limitation, hardware logic in which computational resources are dedicated or otherwise exclusively used in conjunction with weight values or other information corresponding to one or more layers of neurons within a neural network. In at least one embodiment, hardware structure(s) 615 and/or inference and/or training logic of FIG. 6B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, hardware structure(s) 615 and/or inference and/or training logic of FIG. 6B may be used in conjunction with central processing unit (CPU) hardware, graphics processing unit (GPU) hardware or other hardware, such as data processing unit ("DPU") hardware, or field programmable gate arrays (FPGAs). In at least one embodiment, inference and/or training logic includes, without limitation, code and/or data storage 601 and code and/or data storage 605, which may be used to store code (e.g., graph code), weight values and/or other information, including bias values, gradient information, momentum values, and/or other parameter or hyperparameter information. In at least one embodiment illustrated in FIG. 6B, each of code and/or data storage 601 and code and/or data storage 605 is associated with a dedicated computational resource, such as computational hardware 602 and computational hardware 606, respectively. In at least one embodiment, each of computational hardware 602 and computational hardware 606 comprises one or more ALUs that perform mathematical functions, such as linear algebraic functions, only on information stored in code and/or data storage 601 and code and/or data storage 605, respectively, result of which is stored in activation storage 620.

In at least one embodiment, each of code and/or data storage 601 and 605 and corresponding computational hardware 602 and 606, respectively, correspond to different layers of a neural network, such that resulting activation from one "storage/computational pair 601/602" of code and/or data storage 601 and computational hardware 602 is provided as an input to "storage/computational pair 605/606" of code and/or data storage 605 and computational hardware 606, in order to mirror conceptual organization of a neural network. In at least one embodiment, each of storage/computational pairs 601/602 and 605/606 may correspond to more than one neural network layer. In at least one embodiment, additional storage/computation pairs (not shown) subsequent to or in parallel with storage computation pairs 601/602 and 605/606 may be included in inference and/or training logic.

Figure 7:
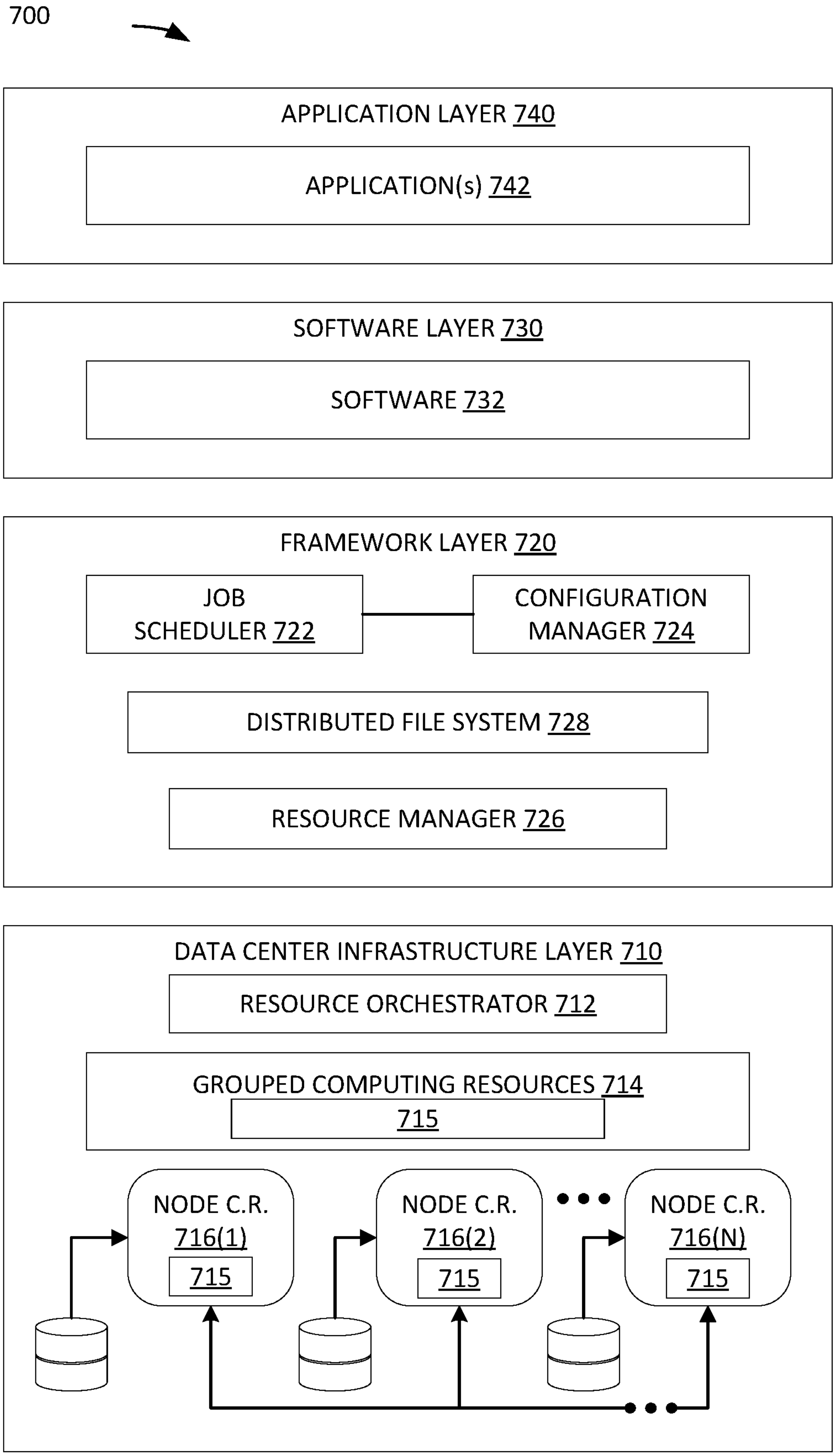
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 1240.

In at least one embodiment, as shown in FIG. 7, data center infrastructure layer 710 may include a resource orchestrator 712, grouped computing resources 714, and node computing resources ("node C.R.s") 616(1)-616(N), where "N" represents any whole, positive integer. In at least one embodiment, node C.R.s 616(1)-616(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 616(1)-616(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 616(1)-616(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 616(1)-616(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 616(1)-616(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic are used to perform inferencing and/or training operations associated with one or more embodiments. Details regarding inference and/or training logic are provided in conjunction with FIGS. 6A and/or 6B. In at least one embodiment, inference and/or training logic may be used in system FIG. 7 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 8:
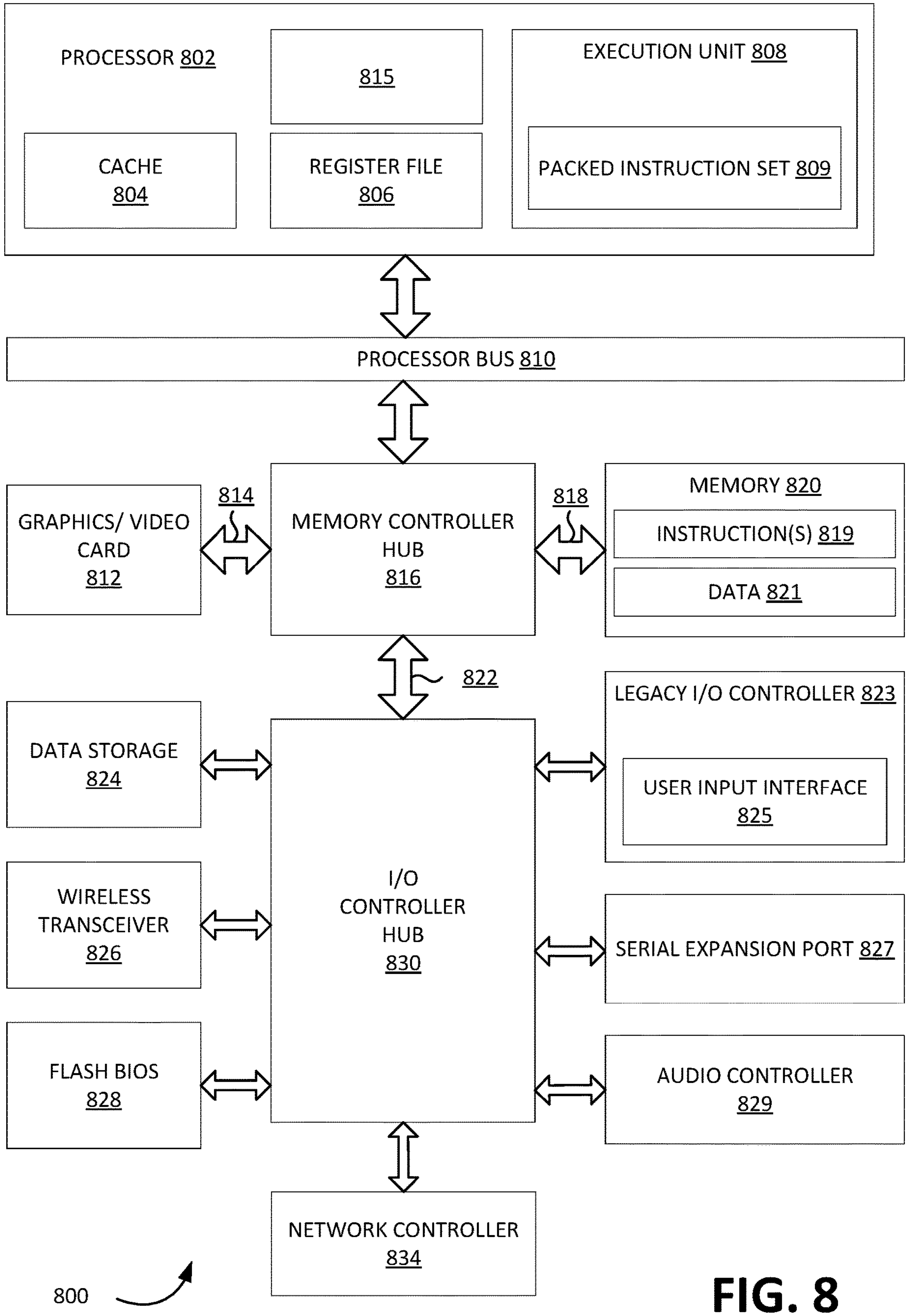
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834, which may include in some embodiments, a data processing unit. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips," whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 8 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 9:
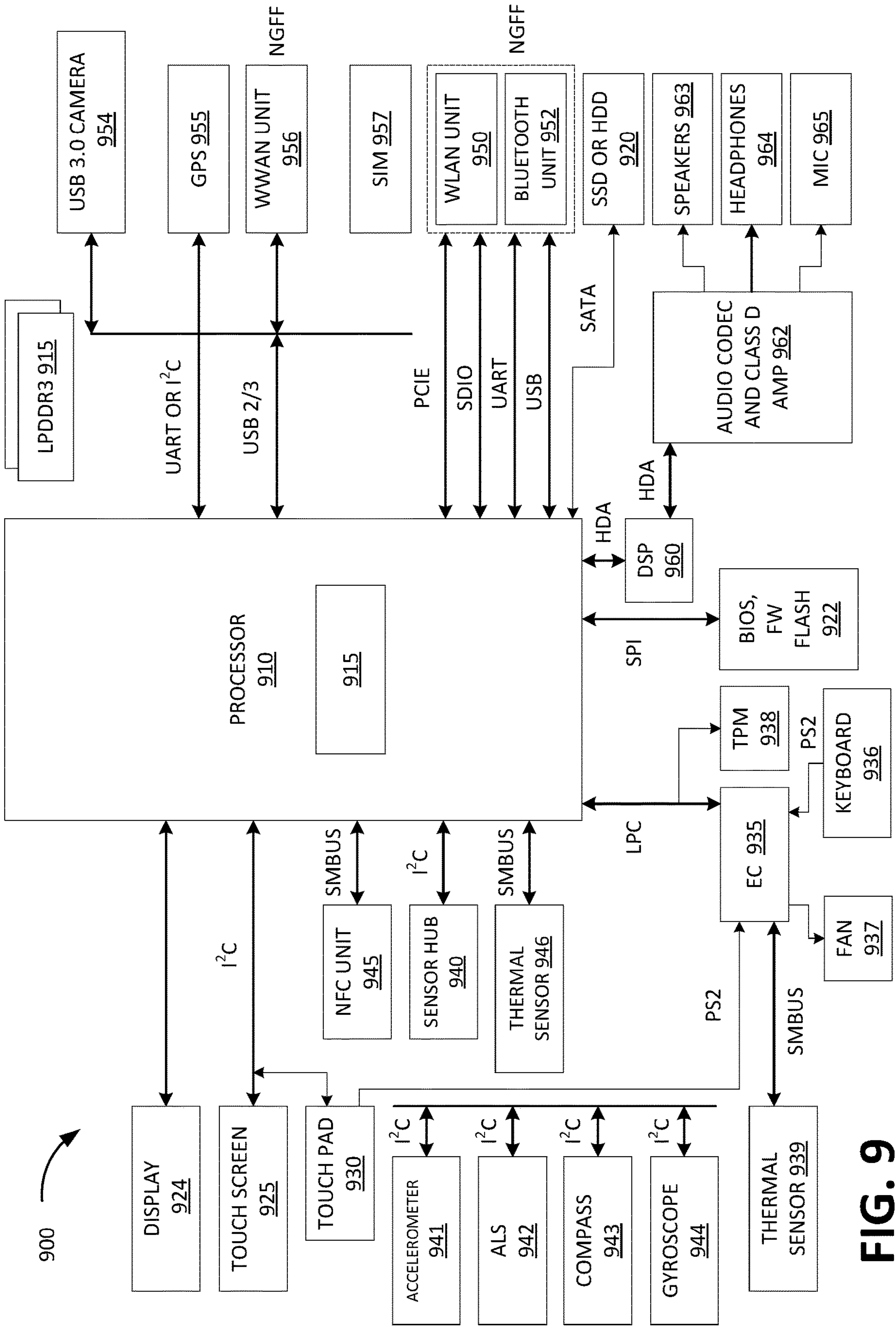
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips," whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 936, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 9 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 10:
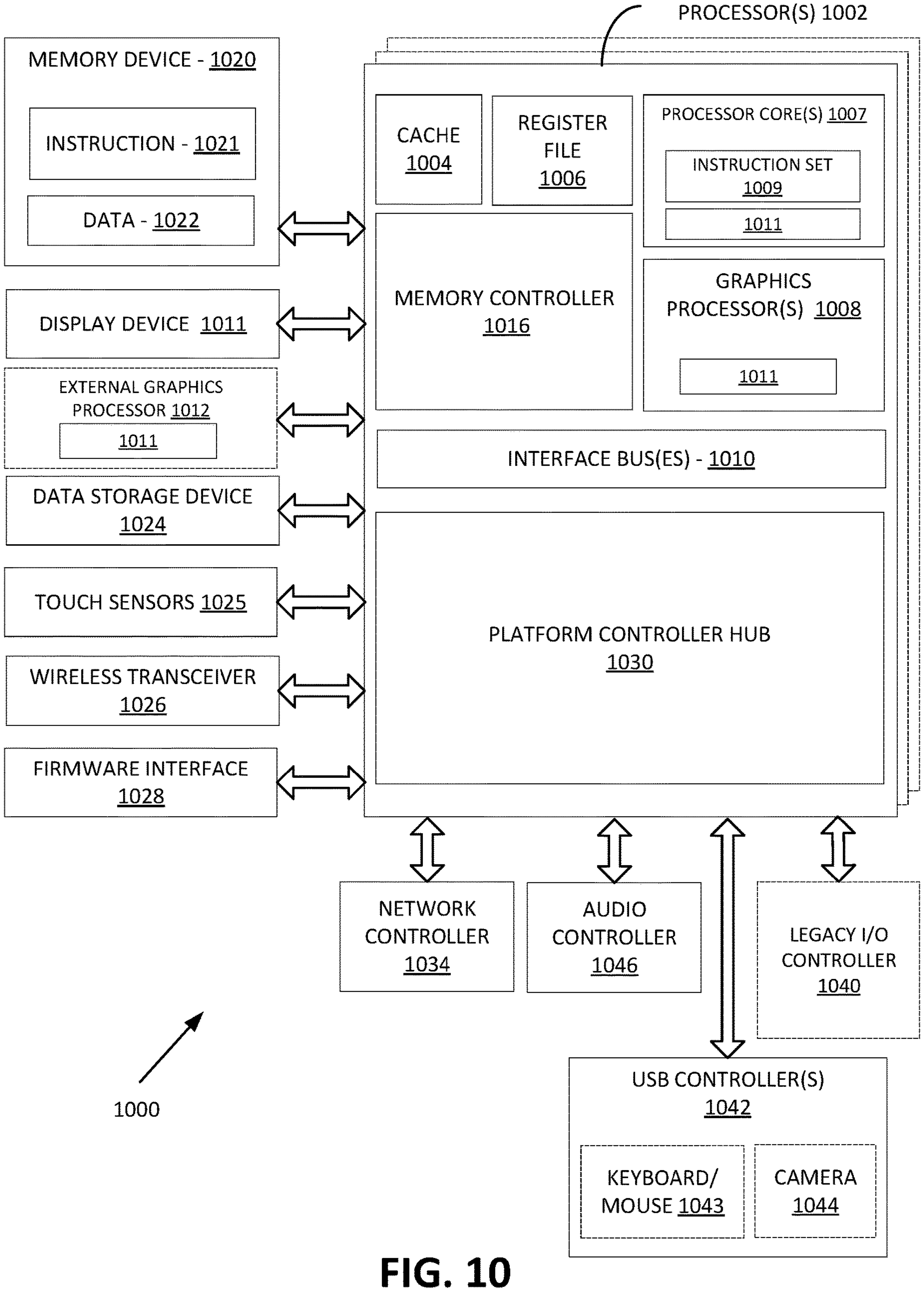
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system having a large number of processors 1002 or processor cores 1007. In at least one embodiment, system 1000 is a processing platform incorporated within a system-on-a-chip (SoC) integrated circuit for use in mobile, handheld, edge, or embedded devices.

In at least one embodiment, system 1000 may include, or be incorporated within a server-based gaming platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 may also include, couple with, or be integrated within a wearable device, such as a smart watch wearable device, smart eyewear device, augmented reality device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 may have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, may be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 may be a dynamic random access memory (DRAM) device, a static random access memory (SRAM) device, flash memory device, phase-change memory device, or some other memory device having suitable performance to serve as process memory. In at least one embodiment memory device 1020 may operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 may connect to processor(s) 1002. In at least one embodiment display device 1011 may include one or more of an internal display device, as in a mobile electronic device or a laptop device or an external display device attached via a display interface (e.g., DisplayPort, etc.). In at least one embodiment, display device 1011 may include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 may connect via a storage interface (e.g., SATA) or via a peripheral bus, such as a Peripheral Component Interconnect bus (e.g., PCI, PCI Express). In at least one embodiment, touch sensors 1025 may include touch screen sensors, pressure sensors, or fingerprint sensors. In at least one embodiment, wireless transceiver 1026 may be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and may be, for example, a unified extensible firmware interface (UEFI). In at least one embodiment, network controller 1034 may enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 may also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1011. In at least one embodiment, platform controller hub 1030 and/or memory controller 1016 may be external to one or more processor(s) 1002. For example, in at least one embodiment, system 1000 may include an external memory controller 1016 and platform controller hub 1030, which may be configured as a memory controller hub and peripheral controller hub within a system chipset that is in communication with processor(s) 1002.

Inference and/or training logic 615 are used to perform inferencing and/or training operations associated with one or more embodiments. Details regarding inference and/or training logic 615 are provided below in conjunction with FIGS. 6A and/or 6B. In at least one embodiment portions or all of inference and/or training logic 615 may be incorporated into graphics processor 1008. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 6A or 6B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 11:
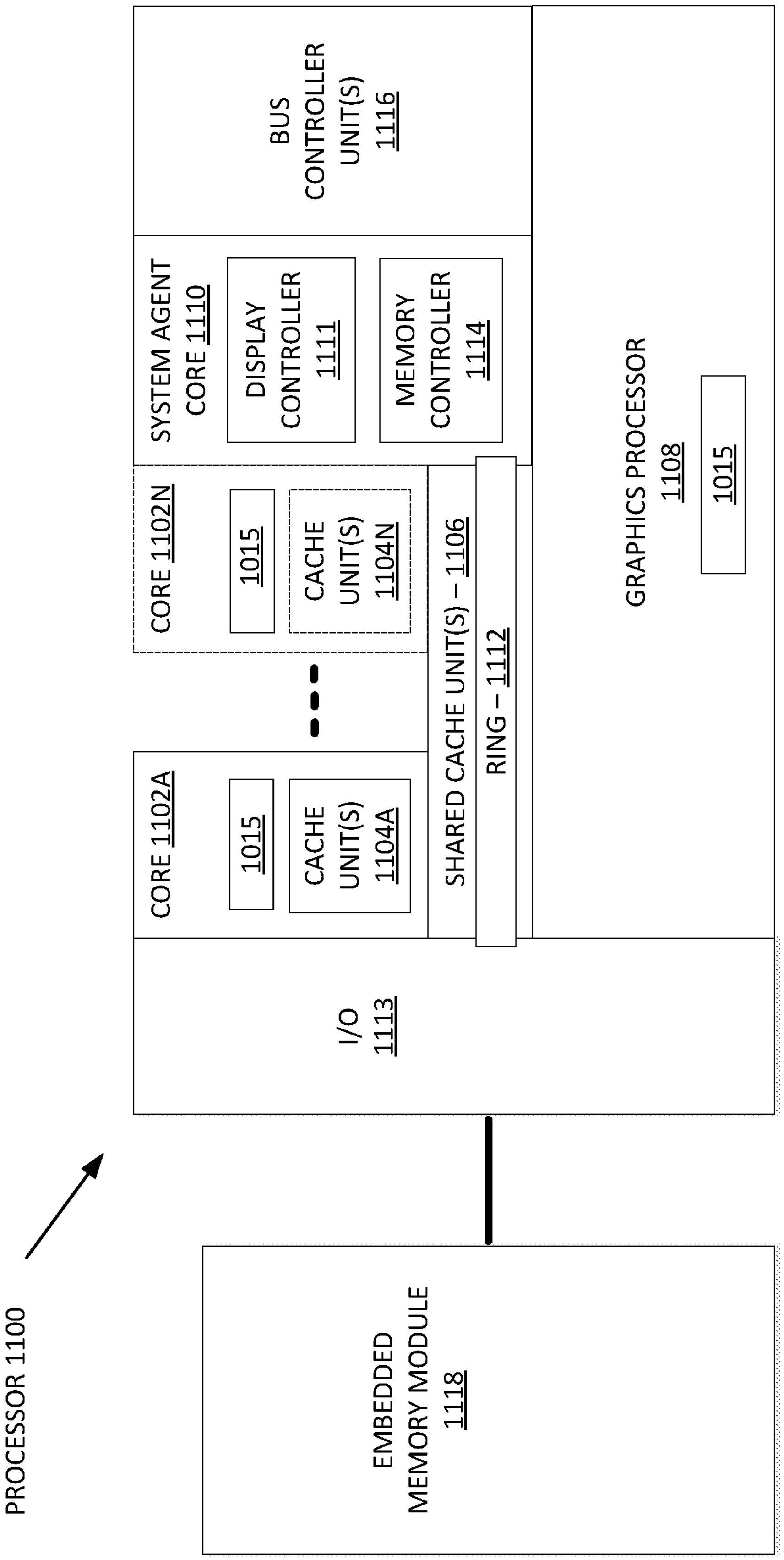
FIG. 11 illustrates at least portions of a graphics processor, according to one or more embodiments.

FIG. 11 is a block diagram of a processor 1100 having one or more processor cores 1102A-1102N, an integrated memory controller 1113, and an integrated graphics processor 1108, according to at least one embodiment. In at least one embodiment, processor 1100 may include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1113 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1113. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 may be implemented on one or more chips or as a SoC integrated circuit.

Inference and/or training logic 615 are used to perform inferencing and/or training operations associated with one or more embodiments. Details regarding inference and/or training logic 615 are provided below in conjunction with FIGS. 6A and/or 6B. In at least one embodiment portions or all of inference and/or training logic 615 may be incorporated into processor 1100. For example, in at least one embodiment, training and/or inferencing techniques described herein may use one or more of ALUs embodied in graphics processor 1108, graphics core(s) 1102A-1102N, or other components in FIG. 11. Moreover, in at least one embodiment, inferencing and/or training operations described herein may be done using logic other than logic illustrated in FIG. 6A or 6B. In at least one embodiment, weight parameters may be stored in on-chip or off-chip memory and/or registers (shown or not shown) that configure ALUs of graphics processor 1100 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 12:
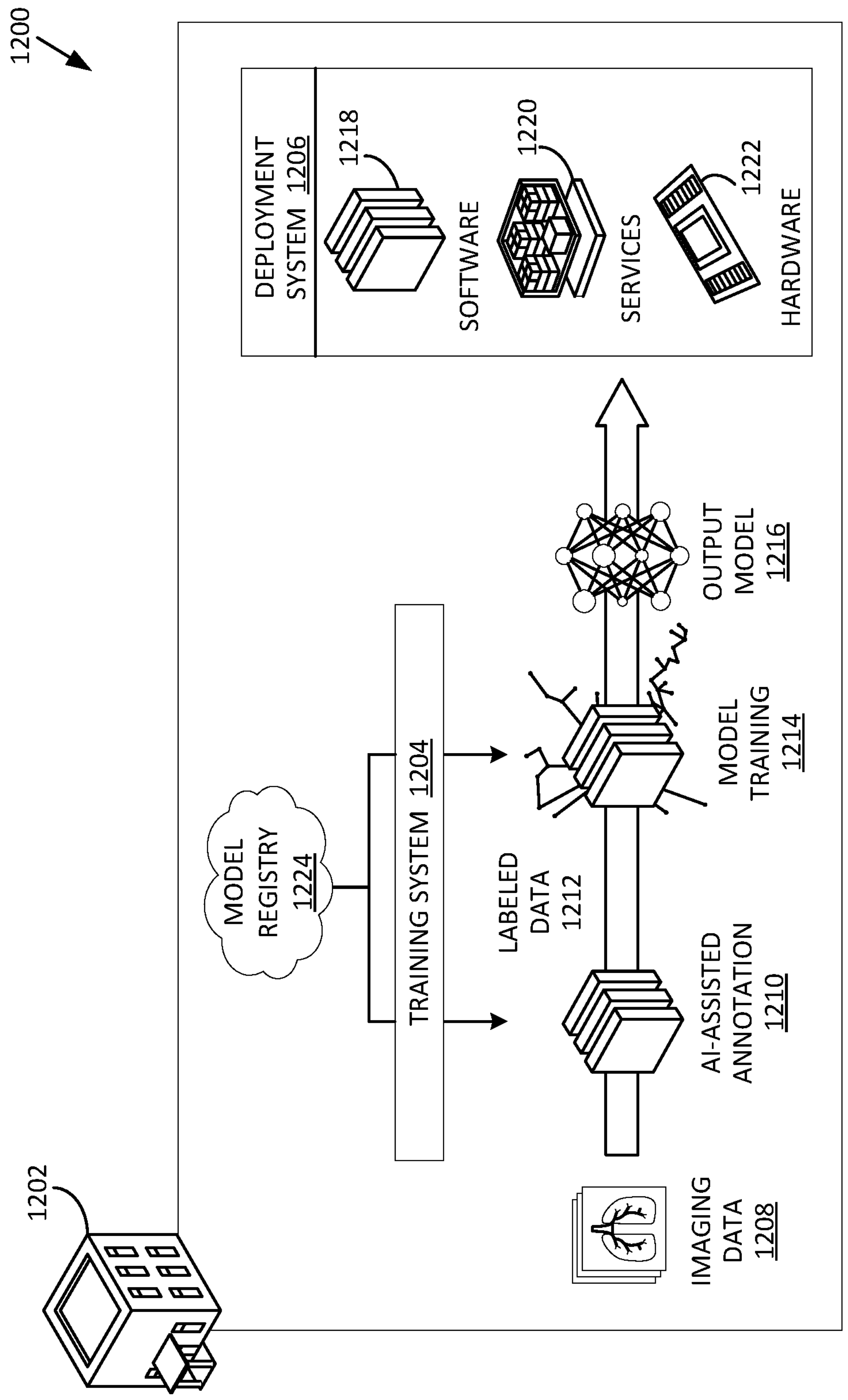
FIG. 12 is an example data flow diagram for an advanced computing pipeline, in accordance with at least one embodiment.

FIG. 12 is an example data flow diagram for a process 1200 of generating and deploying an image processing and inferencing pipeline, in accordance with at least one embodiment. In at least one embodiment, process 1200 may be deployed for use with imaging devices, processing devices, and/or other device types at one or more facilities 1202. Process 1200 may be executed within a training system 1204 and/or a deployment system 1206. In at least one embodiment, training system 1204 may be used to perform training, deployment, and implementation of machine learning models (e.g., neural networks, object detection algorithms, computer vision algorithms, etc.) for use in deployment system 1206. In at least one embodiment, deployment system 1206 may be configured to offload processing and compute resources among a distributed computing environment to reduce infrastructure requirements at facility 1202. In at least one embodiment, one or more applications in a pipeline may use or call upon services (e.g., inference, visualization, compute, AI, etc.) of deployment system 1206 during execution of applications.

In at least one embodiment, some of applications used in advanced processing and inferencing pipelines may use machine learning models or other AI to perform one or more processing steps. In at least one embodiment, machine learning models may be trained at facility 1202 using data 1208 (such as imaging data) generated at facility 1202 (and stored on one or more picture archiving and communication system (PACS) servers at facility 1202), may be trained using imaging or sequencing data 1208 from another facility (ies), or a combination thereof. In at least one embodiment, training system 1204 may be used to provide applications, services, and/or other resources for generating working, deployable machine learning models for deployment system 1206.

In at least one embodiment, model registry 1224 may be backed by object storage that may support versioning and object metadata. In at least one embodiment, object storage may be accessible through, for example, a cloud storage (e.g., cloud 1226 of FIG. 12) compatible application programming interface (API) from within a cloud platform. In at least one embodiment, machine learning models within model registry 1224 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1204 (FIG. 12) may include a scenario where facility 1202 is training their own machine learning model, or has an existing machine learning model that needs to be optimized or updated. In at least one embodiment, imaging data 1208 generated by imaging device(s), sequencing devices, and/or other device types may be received. In at least one embodiment, once imaging data 1208 is received, AI-assisted annotation 1210 may be used to aid in generating annotations corresponding to imaging data 1208 to be used as ground truth data for a machine learning model. In at least one embodiment, AI-assisted annotation 1210 may include one or more machine learning models (e.g., convolutional neural networks (CNNs)) that may be trained to generate annotations corresponding to certain types of imaging data 1208 (e.g., from certain devices). In at least one embodiment, AI-assisted annotations 1210 may then be used directly, or may be adjusted or fine-tuned using an annotation tool to generate ground truth data. In at least one embodiment, AI-assisted annotations 1210, labeled clinic data 1212, or a combination thereof may be used as ground truth data for training a machine learning model. In at least one embodiment, a trained machine learning model may be referred to as output model 1216, and may be used by deployment system 1206, as described herein.

In at least one embodiment, training pipeline 1204 (FIG. 12) may include a scenario where facility 1202 needs a machine learning model for use in performing one or more processing tasks for one or more applications in deployment system 1206, but facility 1202 may not currently have such a machine learning model (or may not have a model that is optimized, efficient, or effective for such purposes). In at least one embodiment, an existing machine learning model may be selected from a model registry 1224. In at least one embodiment, model registry 1224 may include machine learning models trained to perform a variety of different inference tasks on imaging data. In at least one embodiment, machine learning models in model registry 1224 may have been trained on imaging data from different facilities than facility 1202 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1224. In at least one embodiment, a machine learning model may then be retrained, or updated, at any number of other facilities, and a retrained or updated model may be made available in model registry 1224. In at least one embodiment, a machine learning model may then be selected from model registry 1224—and referred to as output model 1216—and may be used in deployment system 1206 to perform one or more processing tasks for one or more applications of a deployment system.

In at least one embodiment, training pipeline 1204 (FIG. 12), a scenario may include facility 1202 requiring a machine learning model for use in performing one or more processing tasks for one or more applications in deployment system 1206, but facility 1202 may not currently have such a machine learning model (or may not have a model that is optimized, efficient, or effective for such purposes). In at least one embodiment, a machine learning model selected from model registry 1224 may not be fine-tuned or optimized for imaging data 1208 generated at facility 1202 because of differences in populations, robustness of training data used to train a machine learning model, diversity in anomalies of training data, and/or other issues with training data. In at least one embodiment, AI-assisted annotation 1210 may be used to aid in generating annotations corresponding to imaging data 1208 to be used as ground truth data for retraining or updating a machine learning model. In at least one embodiment, labeled data 1212 may be used as ground truth data for training a machine learning model. In at least one embodiment, retraining or updating a machine learning model may be referred to as model training 1214. In at least one embodiment, model training 1214—e.g., AI-assisted annotations 1210, labeled clinic data 1212, or a combination thereof—may be used as ground truth data for retraining or updating a machine learning model. In at least one embodiment, a trained machine learning model may be referred to as output model 1216, and may be used by deployment system 1206, as described herein.

In at least one embodiment, deployment system 1206 may include software 1218, services 1220, hardware 1222, and/or other components, features, and functionality. In at least one embodiment, deployment system 1206 may include a software "stack," such that software 1218 may be built on top of services 1220 and may use services 1220 to perform some or all of processing tasks, and services 1220 and software 1218 may be built on top of hardware 1222 and use hardware 1222 to execute processing, storage, and/or other compute tasks of deployment system 1206. In at least one embodiment, software 1218 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1208, in addition to containers that receive and configure imaging data for use by each container and/or for use by facility 1202 after processing through a pipeline (e.g., to convert outputs back to a usable data type). In at least one embodiment, a combination of containers within software 1218 (e.g., that make up a pipeline) may be referred to as a virtual instrument (as described in more detail herein), and a virtual instrument may leverage services 1220 and hardware 1222 to execute some or all processing tasks of applications instantiated in containers.

In at least one embodiment, a data processing pipeline may receive input data (e.g., imaging data 1208) in a specific format in response to an inference request (e.g., a request from a user of deployment system 1206). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1216 of training system 1204.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1224 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1220 as a system (e.g., system 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1200 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., system 1200 of FIG. 12). In at least one embodiment, completed and validated applications or containers may be stored in a container registry and associated machine learning models may be stored in model registry 1224. In at least one embodiment, a requesting entity—who provides an inference or image processing request—may browse a container registry and/or model registry 1224 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1206 (e.g., a cloud) to perform processing of data processing pipeline. In at least one embodiment, processing by deployment system 1206 may include referencing selected elements (e.g., applications, containers, models, etc.) from a container registry and/or model registry 1224. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1220 may be leveraged. In at least one embodiment, services 1220 may include compute services, artificial intelligence (AI) services, visualization services, and/or other service types. In at least one embodiment, services 1220 may provide functionality that is common to one or more applications in software 1218, so functionality may be abstracted to a service that may be called upon or leveraged by applications. In at least one embodiment, functionality provided by services 1220 may run dynamically and more efficiently, while also scaling well by allowing applications to process data in parallel (e.g., using a parallel computing platform 1230 (FIG. 12)). In at least one embodiment, rather than each application that shares a same functionality offered by a service 1220 being required to have a respective instance of service 1220, service 1220 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1220 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1218 implementing advanced processing and inferencing pipeline that includes segmentation application and anomaly detection application may be streamlined because each application may call upon a same inference service to perform one or more inferencing tasks.

In at least one embodiment, hardware 1222 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1222 may be used to provide efficient, purpose-built support for software 1218 and services 1220 in deployment system 1206. In at least one embodiment, use of GPU processing may be implemented for processing locally (e.g., at facility 1202), within an AI/deep learning system, in a cloud system, and/or in other processing components of deployment system 1206 to improve efficiency, accuracy, and efficacy of image processing and generation. In at least one embodiment, software 1218 and/or services 1220 may be optimized for GPU processing with respect to deep learning, machine learning, and/or high-performance computing, as non-limiting examples. In at least one embodiment, at least some of computing environment of deployment system 1206 and/or training system 1204 may be executed in a datacenter one or more supercomputers or high performance computing systems, with GPU optimized software (e.g., hardware and software combination of NVIDIA's DGX System). In at least one embodiment, hardware 1222 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

Figure 13:
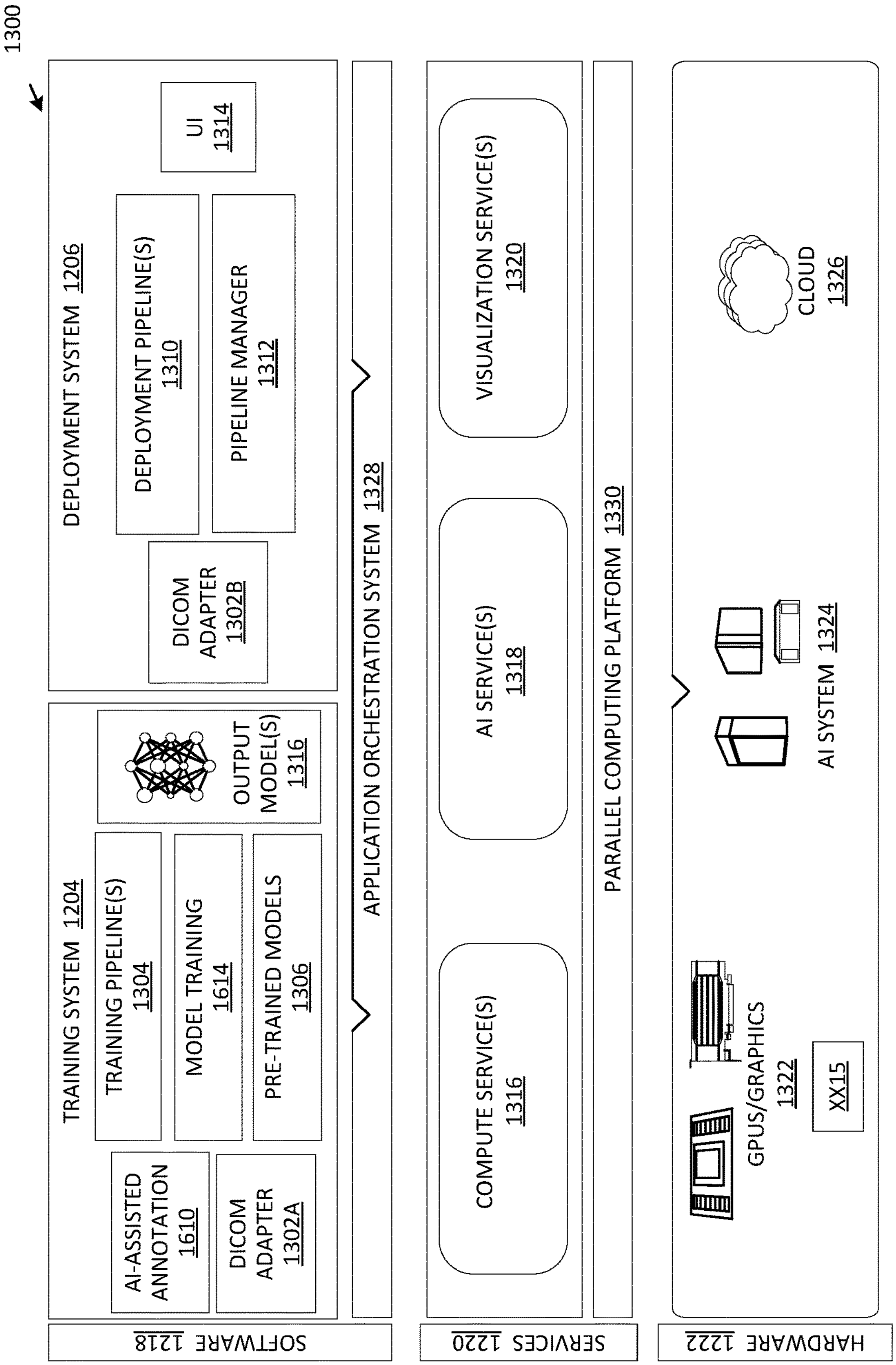
FIG. 13 is a system diagram for an example system for training, adapting, instantiating and deploying machine learning models in an advanced computing pipeline, in accordance with at least one embodiment.

FIG. 13 is a system diagram for an example system 1300 for generating and deploying an imaging deployment pipeline, in accordance with at least one embodiment. In at least one embodiment, system 1300 may be used to implement process 1200 of FIG. 12 and/or other processes including advanced processing and inferencing pipelines. In at least one embodiment, system 1300 may include training system 1204 and deployment system 1206. In at least one embodiment, training system 1204 and deployment system 1206 may be implemented using software 1218, services 1220, and/or hardware 1222, as described herein.

In at least one embodiment, system 1300 (e.g., training system 1204 and/or deployment system 1206) may implemented in a cloud computing environment (e.g., using cloud 1326). In at least one embodiment, system 1300 may be implemented locally with respect to a healthcare services facility, or as a combination of both cloud and local computing resources. In at least one embodiment, access to APIs in cloud 1326 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1300, may be restricted to a set of public IPs that have been vetted or authorized for interaction.

In at least one embodiment, various components of system 1300 may communicate between and among one another using any of a variety of different network types, including but not limited to local area networks (LANs) and/or wide area networks (WANs) via wired and/or wireless communication protocols. In at least one embodiment, communication between facilities and components of system 1300 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1204 may execute training pipelines 1304, similar to those described herein with respect to FIG. 12. In at least one embodiment, where one or more machine learning models are to be used in deployment pipelines 1310 by deployment system 1206, training pipelines 1304 may be used to train or retrain one or more (e.g., pre-trained) models, and/or implement one or more of pre-trained models 1306 (e.g., without a need for retraining or updating). In at least one embodiment, as a result of training pipelines 1304, output model(s) 1216 may be generated. In at least one embodiment, training pipelines 1304 may include any number of processing steps, such as but not limited to imaging data (or other input data) conversion or adaption In at least one embodiment, for different machine learning models used by deployment system 1206, different training pipelines 1304 may be used. In at least one embodiment, training pipeline 1304 similar to a first example described with respect to FIG. 12 may be used for a first machine learning model, training pipeline 1304 similar to a second example described with respect to FIG. 12 may be used for a second machine learning model, and training pipeline 1304 similar to a third example described with respect to FIG. 12 may be used for a third machine learning model. In at least one embodiment, any combination of tasks within training system 1204 may be used depending on what is required for each respective machine learning model. In at least one embodiment, one or more of machine learning models may already be trained and ready for deployment so machine learning models may not undergo any processing by training system 1204, and may be implemented by deployment system 1206.

In at least one embodiment, output model(s) 1216 and/or pre-trained model(s) 1306 may include any types of machine learning models depending on implementation or embodiment. In at least one embodiment, and without limitation, machine learning models used by system 1300 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1304 may include AI-assisted annotation, as described in more detail herein with respect to at least FIG. 12B. In at least one embodiment, labeled data 1212 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1208 (or other data type used by machine learning models), there may be corresponding ground truth data generated by training system 1204. In at least one embodiment, AI-assisted annotation may be performed as part of deployment pipelines 1310; either in addition to, or in lieu of AI-assisted annotation included in training pipelines 1304. In at least one embodiment, system 1300 may include a multi-layer platform that may include a software layer (e.g., software 1218) of diagnostic applications (or other application types) that may perform one or more medical imaging and diagnostic functions. In at least one embodiment, system 1300 may be communicatively coupled to (e.g., via encrypted links) PACS server networks of one or more facilities. In at least one embodiment, system 1300 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1202). In at least one embodiment, applications may then call or execute one or more services 1220 for performing compute, AI, or visualization tasks associated with respective applications, and software 1218 and/or services 1220 may leverage hardware 1222 to perform processing tasks in an effective and efficient manner.

In at least one embodiment, deployment system 1206 may execute deployment pipelines 1310. In at least one embodiment, deployment pipelines 1310 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1310 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1310 depending on information desired from data generated by a device. In at least one embodiment, where detections of anomalies are desired from an MRI machine, there may be a first deployment pipeline 1310, and where image enhancement is desired from output of an MRI machine, there may be a second deployment pipeline 1310.

In at least one embodiment, an image generation application may include a processing task that includes use of a machine learning model. In at least one embodiment, a user may desire to use their own machine learning model, or to select a machine learning model from model registry 1224. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1300—such as services 1220 and hardware 1222—deployment pipelines 1310 may be even more user friendly, provide for easier integration, and produce more accurate, efficient, and timely results. One or more embodiments of the application may be implemented as, or to include a game, a video streaming application, a machine control application, a machine locomotion application, a machine driving application, a synthetic data generation application, a model training application, a perception application, an augmented reality application, a virtual reality application, a mixed reality application, a robotics application, a security and surveillance application, an autonomous or semi-autonomous machine application, a deep learning application, an environment simulation application, a data center processing application, a conversational AI application, a light transport simulation application (e.g., ray tracing, path tracing, etc.), a collaborative content creation application for 3D assets, a digital twin system application, a cloud computing application and/or another type of application or service.

In at least one embodiment, deployment system 1206 may include a user interface 1314 (e.g., a graphical user interface, a web interface, etc.) that may be used to select applications for inclusion in deployment pipeline(s) 1310, arrange applications, modify, or change applications or parameters or constructs thereof, use and interact with deployment pipeline(s) 1310 during set-up and/or deployment, and/or to otherwise interact with deployment system 1206. In at least one embodiment, although not illustrated with respect to training system 1204, user interface 1314 (or a different user interface) may be used for selecting models for use in deployment system 1206, for selecting models for training, or retraining, in training system 1204, and/or for otherwise interacting with training system 1204.

In at least one embodiment, pipeline manager 1312 may be used, in addition to an application orchestration system 1328, to manage interaction between applications or containers of deployment pipeline(s) 1310 and services 1220 and/or hardware 1222. In at least one embodiment, pipeline manager 1312 may be configured to facilitate interactions from application to application, from application to service 1220, and/or from application or service to hardware 1222. In at least one embodiment, although illustrated as included in software 1218, this is not intended to be limiting, and in some examples (e.g., as illustrated in FIG. 11) pipeline manager 1312 may be included in services 1220. In at least one embodiment, application orchestration system 1328 (e.g., Kubernetes, DOCKER, etc.) may include a container orchestration system that may group applications into containers as logical units for coordination, management, scaling, and deployment. In at least one embodiment, by associating applications from deployment pipeline(s) 1310 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1312 and application orchestration system 1328. In at least one embodiment, so long as an expected input and/or output of each container or application is known by a system (e.g., based on constructs of applications or containers), application orchestration system 1328 and/or pipeline manager 1312 may facilitate communication among and between, and sharing of resources among and between, each of applications or containers. In at least one embodiment, because one or more of applications or containers in deployment pipeline(s) 1310 may share same services and resources, application orchestration system 1328 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1328) may determine resource availability and distribution based on constraints imposed on a system (e.g., user constraints), such as quality of service (QOS), urgency of need for data outputs (e.g., to determine whether to execute real-time processing or delayed processing), etc.

In at least one embodiment, services 1220 leveraged by and shared by applications or containers in deployment system 1206 may include compute services 1316, AI services 1318, visualization services 1320, and/or other service types. In at least one embodiment, applications may call (e.g., execute) one or more of services 1220 to perform processing operations for an application. In at least one embodiment, compute services 1316 may be leveraged by applications to perform super-computing or other high-performance computing (HPC) tasks. In at least one embodiment, compute service(s) 1316 may be leveraged to perform parallel processing (e.g., using a parallel computing platform 1330) for processing data through one or more of applications and/or one or more tasks of a single application, substantially simultaneously. In at least one embodiment, parallel computing platform 1330 (e.g., NVIDIA's CUDA) may enable general purpose computing on GPUs (GPGPU) (e.g., GPUs 1322). In at least one embodiment, a software layer of parallel computing platform 1330 may provide access to virtual instruction sets and parallel computational elements of GPUs, for execution of compute kernels. In at least one embodiment, parallel computing platform 1330 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1330 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1318 may be leveraged to perform inferencing services for executing machine learning model(s) associated with applications (e.g., tasked with performing one or more processing tasks of an application). In at least one embodiment, AI services 1318 may leverage AI system 1324 to execute machine learning model(s) (e.g., neural networks, such as CNNs) for segmentation, reconstruction, object detection, feature detection, classification, and/or other inferencing tasks. In at least one embodiment, applications of deployment pipeline(s) 1310 may use one or more of output models 1216 from training system 1204 and/or other models of applications to perform inference on imaging data. In at least one embodiment, two or more examples of inferencing using application orchestration system 1328 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1328 may distribute resources (e.g., services 1220 and/or hardware 1222) based on priority paths for different inferencing tasks of AI services 1318.

In at least one embodiment, shared storage may be mounted to AI services 1318 within system 1300. In at least one embodiment, shared storage may operate as a cache (or other storage device type) and may be used to process inference requests from applications. In at least one embodiment, when an inference request is submitted, a request may be received by a set of API instances of deployment system 1206, and one or more instances may be selected (e.g., for best fit, for load balancing, etc.) to process a request. In at least one embodiment, to process a request, a request may be entered into a database, a machine learning model may be located from model registry 1224 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1312) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<12 min). In at least one embodiment, model execution times may be measured from requesting institution or entity and may include partner network traversal time, as well as execution on an inference service.

In at least one embodiment, transfer of requests between services 1220 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1326, and an inference service may perform inferencing on a GPU.

In at least one embodiment, visualization services 1320 may be leveraged to generate visualizations for viewing outputs of applications and/or deployment pipeline(s) 1310. In at least one embodiment, GPUs 1322 may be leveraged by visualization services 1320 to generate visualizations. In at least one embodiment, rendering effects, such as ray-tracing, may be implemented by visualization services 1320 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1320 may include an internal visualizer, cinematics, and/or other rendering or image processing capabilities or functionality (e.g., ray tracing, rasterization, internal optics, etc.).

In at least one embodiment, hardware 1222 may include GPUs 1322, AI system 1324, cloud 1326, and/or any other hardware used for executing training system 1204 and/or deployment system 1606. In at least one embodiment, GPUs 1322 (e.g., NVIDIA's TESLA and/or QUADRO GPUs) may include any number of GPUs that may be used for executing processing tasks of compute services 1316, AI services 1318, visualization services 1320, other services, and/or any of features or functionality of software 1218. For example, with respect to AI services 1318, GPUs 1322 may be used to perform pre-processing on imaging data (or other data types used by machine learning models), post-processing on outputs of machine learning models, and/or to perform inferencing (e.g., to execute machine learning models). In at least one embodiment, cloud 1326, AI system 1324, and/or other components of system 1300 may use GPUs 1322. In at least one embodiment, cloud 1326 may include a GPU-optimized platform for deep learning tasks. In at least one embodiment, AI system 1324 may use GPUs, and cloud 1326—or at least a portion tasked with deep learning or inferencing—may be executed using one or more AI systems 1324. As such, although hardware 1222 is illustrated as discrete components, this is not intended to be limiting, and any components of hardware 1222 may be combined with, or leveraged by, any other components of hardware 1222.

In at least one embodiment, AI system 1324 may include a purpose-built computing system (e.g., a super-computer or an HPC) configured for inferencing, deep learning, machine learning, and/or other artificial intelligence tasks. In at least one embodiment, AI system 1324 (e.g., NVIDIA's DGX) may include GPU-optimized software (e.g., a software stack) that may be executed using a plurality of GPUs 1322, in addition to DPUs, CPUs, RAM, storage, and/or other components, features, or functionality. In at least one embodiment, one or more AI systems 1324 may be implemented in cloud 1326 (e.g., in a data center) for performing some or all of AI-based processing tasks of system 1300.

In at least one embodiment, cloud 1326 may include a GPU-accelerated infrastructure (e.g., NVIDIA's NGC) that may provide a GPU-optimized platform for executing processing tasks of system 1300. In at least one embodiment, cloud 1326 may include an AI system(s) 1324 for performing one or more of AI-based tasks of system 1300 (e.g., as a hardware abstraction and scaling platform). In at least one embodiment, cloud 1326 may integrate with application orchestration system 1328 leveraging multiple GPUs to enable seamless scaling and load balancing between and among applications and services 1220. In at least one embodiment, cloud 1326 may tasked with executing at least some of services 1220 of system 1300, including compute services 1316, AI services 1318, and/or visualization services 1320, as described herein. In at least one embodiment, cloud 1326 may perform small and large batch inference (e.g., executing NVIDIA's TENSOR RT), provide an accelerated parallel computing API and platform 1330 (e.g., NVIDIA's CUDA), execute application orchestration system 1328 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1300.

Figure 14A:
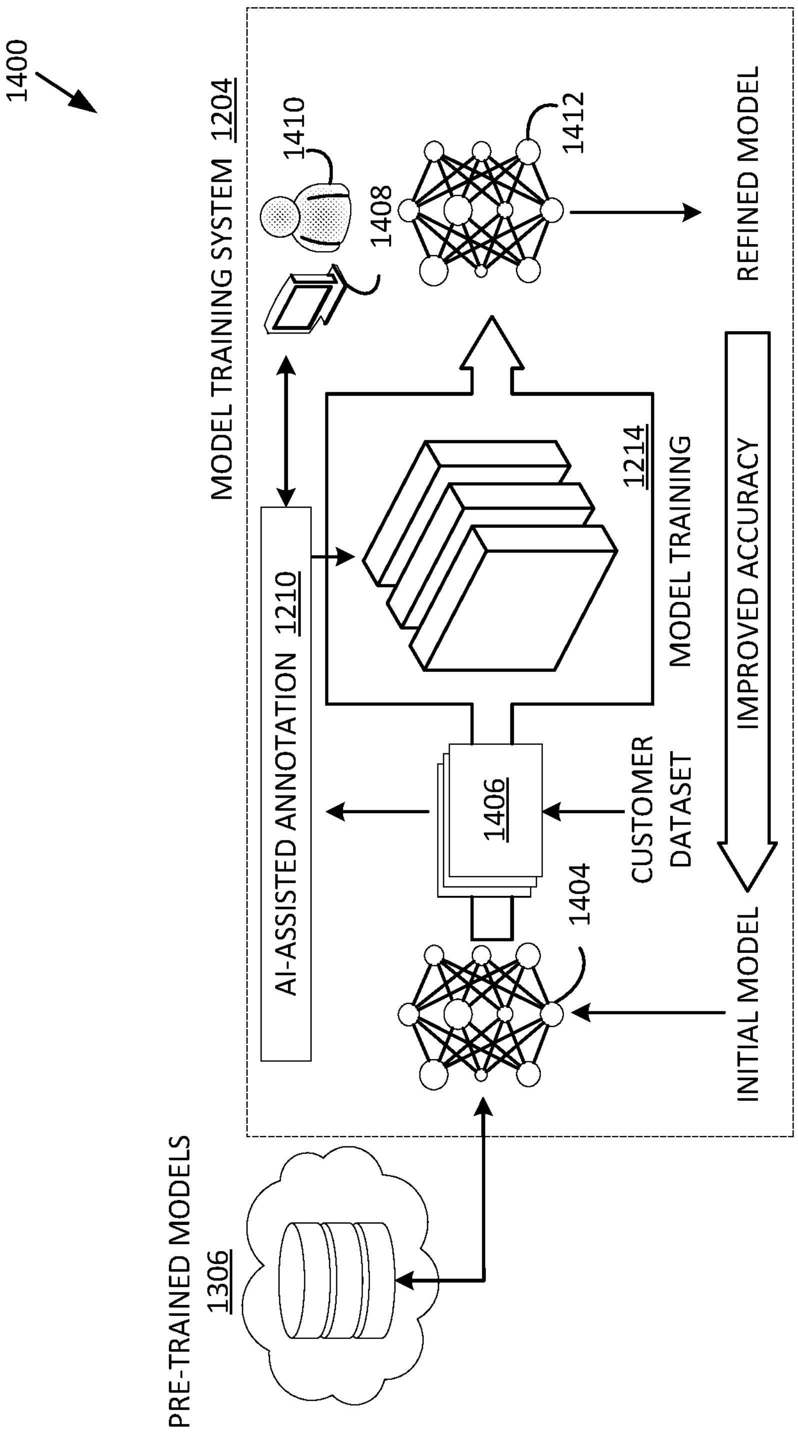
FIGS. 14A and 14B illustrate a data flow diagram for a process to train a machine learning model, as well as client-server architecture to enhance annotation tools with pre-trained annotation models, in accordance with at least one embodiment.

FIG. 14A illustrates a data flow diagram for a process 1400 to train, retrain, or update a machine learning model, in accordance with at least one embodiment. In at least one embodiment, process 1400 may be executed using, as a non-limiting example, system 1300 of FIG. 13. In at least one embodiment, process 1400 may leverage services 1220 and/or hardware 1222 of system 1300, as described herein. In at least one embodiment, refined models 1412 generated by process 1400 may be executed by deployment system 1206 for one or more containerized applications in deployment pipelines 1310.

In at least one embodiment, model training 1214 may include retraining or updating an initial model 1404 (e.g., a pre-trained model) using new training data (e.g., new input data, such as customer dataset 1406, and/or new ground truth data associated with input data). In at least one embodiment, to retrain, or update, initial model 1404, output or loss layer(s) of initial model 1404 may be reset, or deleted, and/or replaced with an updated or new output or loss layer(s). In at least one embodiment, initial model 1404 may have previously fine-tuned parameters (e.g., weights and/or biases) that remain from prior training, so training or retraining 1214 may not take as long or require as much processing as training a model from scratch. In at least one embodiment, during model training 1214, by having reset or replaced output or loss layer(s) of initial model 1404, parameters may be updated and re-tuned for a new data set based on loss calculations associated with accuracy of output or loss layer(s) at generating predictions on new, customer dataset 1406 (e.g., image data 1208 of FIG. 12).

In at least one embodiment, pre-trained models 1306 may be stored in a data store, or registry (e.g., model registry 1224 of FIG. 12). In at least one embodiment, pre-trained models 1306 may have been trained, at least in part, at one or more facilities other than a facility executing process 1400. In at least one embodiment, to protect privacy and rights of patients, subjects, or clients of different facilities, pre-trained models 1306 may have been trained, on-premise, using customer or patient data generated on-premise. In at least one embodiment, pre-trained models 1306 may be trained using cloud 1326 and/or other hardware 1222, but confidential, privacy protected patient data may not be transferred to, used by, or accessible to any components of cloud 1326 (or other off premise hardware). In at least one embodiment, where a pre-trained model 1306 is trained at using patient data from more than one facility, pre-trained model 1306 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1306 on-premise and/or off premise, such as in a datacenter or other cloud computing infrastructure.

In at least one embodiment, when selecting applications for use in deployment pipelines 1310, a user may also select machine learning models to be used for specific applications. In at least one embodiment, a user may not have a model for use, so a user may select a pre-trained model 1306 to use with an application. In at least one embodiment, pre-trained model 1306 may not be optimized for generating accurate results on customer dataset 1406 of a facility of a user (e.g., based on patient diversity, demographics, types of medical imaging devices used, etc.). In at least one embodiment, prior to deploying pre-trained model 1306 into deployment pipeline 1310 for use with an application(s), pre-trained model 1306 may be updated, retrained, and/or fine-tuned for use at a respective facility.

In at least one embodiment, a user may select pre-trained model 1306 that is to be updated, retrained, and/or fine-tuned, and pre-trained model 1306 may be referred to as initial model 1404 for training system 1204 within process 1400. In at least one embodiment, customer dataset 1406 (e.g., imaging data, genomics data, sequencing data, or other data types generated by devices at a facility) may be used to perform model training 1214 (which may include, without limitation, transfer learning) on initial model 1404 to generate refined model 1412. In at least one embodiment, ground truth data corresponding to customer dataset 1406 may be generated by training system 1204. In at least one embodiment, ground truth data may be generated, at least in part, by clinicians, scientists, doctors, practitioners, at a facility (e.g., as labeled clinic data 1212 of FIG. 12).

In at least one embodiment, AI-assisted annotation 1210 may be used in some examples to generate ground truth data. In at least one embodiment, AI-assisted annotation 1210 (e.g., implemented using an AI-assisted annotation SDK) may leverage machine learning models (e.g., neural networks) to generate suggested or predicted ground truth data for a customer dataset. In at least one embodiment, user 1410 may use annotation tools within a user interface (a graphical user interface (GUI)) on computing device 1408.

In at least one embodiment, user 1410 may interact with a GUI via computing device 1408 to edit or fine-tune (auto) annotations. In at least one embodiment, a polygon editing feature may be used to move vertices of a polygon to more accurate or fine-tuned locations.

In at least one embodiment, once customer dataset 1406 has associated ground truth data, ground truth data (e.g., from AI-assisted annotation, manual labeling, etc.) may be used by during model training 1214 to generate refined model 1412. In at least one embodiment, customer dataset 1406 may be applied to initial model 1404 any number of times, and ground truth data may be used to update parameters of initial model 1404 until an acceptable level of accuracy is attained for refined model 1412. In at least one embodiment, once refined model 1412 is generated, refined model 1412 may be deployed within one or more deployment pipelines 1210 at a facility for performing one or more processing tasks with respect to medical imaging data.

In at least one embodiment, refined model 1412 may be uploaded to pre-trained models 1206 in model registry 1224 to be selected by another facility. In at least one embodiment, his process may be completed at any number of facilities such that refined model 1412 may be further refined on new datasets any number of times to generate a more universal model.

Figure 14B:
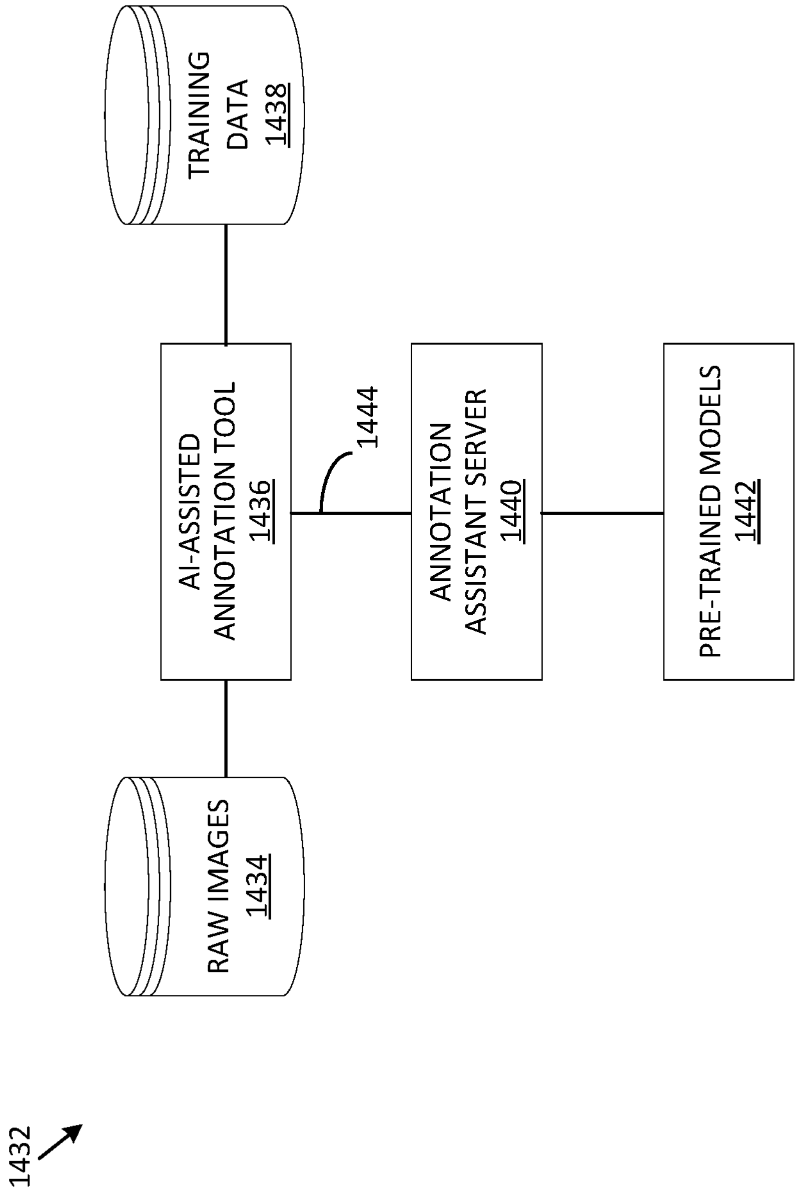

FIG. 14B is an example illustration of a client-server architecture 1432 to enhance annotation tools with pre-trained annotation models, in accordance with at least one embodiment. In at least one embodiment, AI-assisted annotation tools 1436 may be instantiated based on a client-server architecture 1432. In at least one embodiment, annotation tools 1436 in imaging applications may aid radiologists, for example, identify organs and abnormalities. In at least one embodiment, imaging applications may include software tools that help user 1410 to identify, as a non-limiting example, a few extreme points on a particular organ of interest in raw images 1434 (e.g., in a 3D MRI or CT scan) and receive auto-annotated results for all 2D slices of a particular organ. In at least one embodiment, results may be stored in a data store as training data 1438 and used as (for example and without limitation) ground truth data for training. In at least one embodiment, when computing device 1408 sends extreme points for AI-assisted annotation 1210, a deep learning model, for example, may receive this data as input and return inference results of a segmented organ or abnormality. In at least one embodiment, pre-instantiated annotation tools, such as AI-Assisted Annotation Tool 1436B in FIG. 14B, may be enhanced by making API calls (e.g., API Call 1444) to a server, such as an Annotation Assistant Server 1440 that may include a set of pre-trained models 1442 stored in an annotation model registry, for example. In at least one embodiment, an annotation model registry may store pre-trained models 1442 (e.g., machine learning models, such as deep learning models) that are pre-trained to perform AI-assisted annotation on a particular organ or abnormality. These models may be further updated by using training pipelines 1304. In at least one embodiment, pre-installed annotation tools may be improved over time as new labeled clinic data 1212 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A. C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

receiving a request to initiate a testing process for each of a plurality of processing units, a first processing unit of the plurality of processing units executing a first set of operations by a first virtual processor and a second processing unit of the plurality of processing units executing a second set of operations by a second virtual processor;

causing execution of the first set of operations by the first virtual processor to be transferred from the first processing unit to the second processing unit by updating a first operation queue of the second virtual processor to include execution state data associated with at least one operation of the first set of operations that was executed by the first virtual processor;

initiating execution of the testing process at the first processing unit while the second processing unit executes:

the first set of operations by the first virtual processor in accordance with the execution state data, and the second set of operations by the second virtual processor;

responsive to detecting that the execution of the testing process is completed at the first processing unit, causing execution of the first set of operations by the first virtual processor and the second set of operations by the second virtual processor to be transferred from the second processing unit to the first processing unit by updating a second operation queue of the first virtual processor to include execution state data associated with at least one of an operation of the first set of operations or an operation of the second set of operations that was executed by the second virtual processor; and initiating execution of the testing process at the second processing unit while the first processing unit executes the first set of operations by the first virtual processor and the second set of operations by the second virtual processor.

2. The method of claim 1, wherein a third processing unit of the plurality of processing units hosts a third virtual processor executing a third set of operations, and wherein the method further comprises:

responsive to detecting that execution of the testing process is completed at the second processing unit, causing execution of the third set of operations to be transferred from the third virtual processor to the second virtual processor; and initiating execution of the testing process at the third processing unit while the first virtual processor executes at least one of the first set of operations or the second set of operations and the second virtual processor executes the third set of operations.

3. The method of claim 1, wherein the testing process is a fault detection process, and wherein the method further comprises:

determining, based on a performance of the testing process of at least one processing unit of the plurality of processing units, whether a fault occurred at the at least one processing unit; and responsive to determining that a fault occurred at the at least one processing unit, transmitting an alert indicating the fault.

4. The method of claim 1, wherein the first processing unit and the second processing unit are components of a first processor core of a system comprising the plurality of processing units.

5. The method of claim 4, wherein the plurality of processing units further comprises a fourth processing unit and a fifth processing unit that are components of a second processor core of the system, wherein the fourth processing unit executes a fourth set of operations associated with a fourth virtual processor and the fifth processing unit executes a fifth set of operations associated with a fifth virtual processor, and wherein the method further comprises:

responsive to the request to initiate the testing process, causing execution of the fourth set of operations to be transferred from the fourth virtual processor to the fifth virtual processor; and initiating execution of the testing process at the fourth processing unit while the testing process is simultaneously performed using at least one of the first processing unit or the second processing unit of the first processor core.

6. The method of claim 1, wherein the first virtual processor and the second virtual processor are associated with a virtual computing system running on the plurality of processing units.

7. The method of claim 6, wherein the virtual computing system comprises at least one of a virtual machine or a container.

8. The method of claim 1, wherein causing execution of the first set of operations to be transferred from the first virtual processor to the second virtual processor further comprises transmitting a first instruction to a virtual system manager associated with the first virtual processor and the second virtual processor to transfer execution of the first set of operations from the first virtual processor to the second virtual processor, and wherein causing execution of the first set of operations and the second set of operations to be transferred from the second virtual processor to the first virtual processor comprises further transmitting a second instruction to the virtual system manager to transfer execution of the first set of operations and the second set of operations from the first virtual processor to the second virtual processor.

9. The method of claim 1, wherein the plurality of processing units is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system for presenting at least one of virtual reality content, augmented reality content, or mixed reality content;

a system implemented at least partially in a data center; or a system implemented at least partially using cloud computing resources.

10. A system comprising:

a memory; and a processing device comprising one or more processors, the one or more processors configured to perform operations comprising:

receiving a request to initiate a testing process for each of a plurality of processing units, a first processing unit of the plurality of processing units including a first virtual processor executing a first set of operations and a second processing unit of the plurality of processing units including a second virtual processor executing a second set of operations;

causing execution of the first set of operations to be transferred from the first virtual processor to the second virtual processor by updating a first operation queue of the second virtual processor to include execution state data associated with at least one operation of the first set of operations that was executed by the first virtual processor;

initiating execution of the testing process at the first processing unit while the second virtual processor running on the second processing unit executes; 'the first set of operations in accordance with the execution state data, and the second set of operations;

responsive to detecting that the execution of the testing process is completed at the first processing unit, causing execution of the first set of operations and the second set of operations to be transferred from the second virtual processor to the first virtual processor by updating a second operation queue of the first virtual processor to include execution state data associated with at least one of an operation of the first set of operations or an operation of the second set of operations that was executed by the second virtual processor; and initiating execution of the testing process at the second processing unit while the first virtual processor running on the first processing unit executes the first set of operations and the second set of operations.

11. The system of claim 10, wherein a third processing unit of the plurality of processing units hosts a third virtual processor executing a third set of operations, and wherein the operations further comprise:

responsive to detecting that execution of the testing process is completed at the second processing unit, causing execution of the third set of operations to be transferred from the third virtual processor to the second virtual processor; and initiating execution of the testing process at the third processing unit while the first virtual processor executes at least one of the first set of operations or the second set of operations and the second virtual processor executes the third set of operations.

12. The system of claim 10, wherein the testing process is a fault detection process, and wherein the operations further comprise:

determining, based on a performance of the testing process of at least one processing unit of the plurality of processing units, whether a fault occurred at the at least one processing unit; and responsive to determining that a fault occurred at the at least one processing unit, transmitting an alert indicating the fault.

13. The system of claim 10, wherein the first processing unit and the second processing unit are components of a first processor core of a system comprising the plurality of processing units.

14. The system of claim 13, wherein the plurality of processing units further comprises a fourth processing unit and a fifth processing unit that are components of a second processor core of the system, wherein the fourth processing unit executes a fourth set of operations associated with a fourth virtual processor and the fifth processing unit executes a fifth set of operations associated with a fifth virtual processor, and wherein the operations further comprise:

responsive to the request to initiate the testing process, causing execution of the fourth set of operations to be transferred from the fourth virtual processor to the fifth virtual processor; and initiating execution of the testing process at the fourth processing unit while the testing process is simultaneously performed using at least one of the first processing unit or the second processing unit of the first processor core.

15. The system of claim 10, wherein the first virtual processor and the second virtual processor are associated with a virtual computing system running on the plurality of processing units.

16. The system of claim 15, wherein the virtual computing system comprises at least one of a virtual machine or a container.

17. A processor comprising:

a plurality of processing units; and a controller to:

receive a request to initiate a testing process for each of a plurality of processing units, a first processing unit of the plurality of processing units including a first virtual processor executing a first set of operations and a second processing unit of the plurality of processing units including a second virtual processor executing a second set of operations;

cause execution of the first set of operations to be transferred from the first virtual processor to the second virtual processor by updating a first operation queue of the second virtual processor to include execution state data associated with at least one operation of the first set of operations that was executed by the first virtual processor;

initiate execution of the testing process at the first processing unit while the second virtual processor running on the second processing unit executes:

the first set of operations in accordance with the execution state data, and the second set of operations;

responsive to detecting that the execution of the testing process is completed at the first processing unit, cause execution of the first set of operations and the second set of operations to be transferred from the second virtual processor to the first virtual processor by updating a second operation queue of the first virtual processor to include execution state data associated with at least one of an operation of the first set of operations or an operation of the second set of operations that was executed by the second virtual processor; and initiate execution of the testing process at the second processing unit while the first virtual processor running on the first processing unit executes the first set of operations and the second set of operations.

18. The processor of claim 17, wherein a third processing unit of the plurality of processing units hosts a third virtual processor executing a third set of operations, and wherein the controller is further to:

responsive to detecting that execution of the testing process is completed at the second processing unit, cause execution of the third set of operations to be transferred from the third virtual processor to the second virtual processor; and initiate execution of the testing process at the third processing unit while the first virtual processor executes at least one of the first set of operations or the second set of operations and the second virtual processor executes the third set of operations.

19. The processor of claim 18, wherein the testing process is a fault detection process, and wherein the controller is further to:

determine, based on a performance of the testing process of at least one processing unit of the plurality of processing units, whether a fault occurred at the at least one processing unit; and responsive to determining that a fault occurred at the at least one processing unit, transmit an alert indicating the fault.

20. The processor of claim 18, wherein the first processing unit and the second processing unit are components of a first processor core of a system comprising the plurality of processing units.

* * * * *